(12) United States Patent
Tanikawa

(10) Patent No.: US 11,245,890 B2
(45) Date of Patent: Feb. 8, 2022

(54) COMMUNICATION APPARATUS, GENERATED DATA SIZE CONTROL METHOD, COMMUNICATION METHOD, AND PROGRAM

(71) Applicant: Sony Interactive Entertainment Inc., Tokyo (JP)

(72) Inventor: Masakazu Tanikawa, Chiba (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/982,857

(22) PCT Filed: Apr. 4, 2018

(86) PCT No.: PCT/JP2018/014368
§ 371 (c)(1),
(2) Date: Sep. 21, 2020

(87) PCT Pub. No.: WO2019/193667
PCT Pub. Date: Oct. 10, 2019

(65) Prior Publication Data
US 2021/0058601 A1 Feb. 25, 2021

(51) Int. Cl.
*H04N 13/194* (2018.01)
*H04N 13/172* (2018.01)
(Continued)

(52) U.S. Cl.
CPC ........... *H04N 13/194* (2018.05); *H04L 5/16* (2013.01); *H04N 13/172* (2018.05); *H04W 72/042* (2013.01)

(58) Field of Classification Search
USPC .......................................................... 348/43
See application file for complete search history.

(56) References Cited

U.S. PATENT DOCUMENTS 8,516,069 B1 * 8/2013 Sebastian ............. H04L 69/324
709/213
10,594,361 B2    3/2020 Miyashita
(Continued)

FOREIGN PATENT DOCUMENTS

JP    2008219479 A    9/2008
JP    2009027659 A    2/2009
(Continued)

OTHER PUBLICATIONS

International Preliminary Report on Patentability for corresponding PCT Application No. PCT/JP2018/014368, 13 pages, dated Oct. 15, 2020.
(Continued)

*Primary Examiner* — Behrooz M Senfi
(74) *Attorney, Agent, or Firm* — Matthew B. Dernier, Esq.

(57) ABSTRACT

A video data transmission unit transmits data generated by a video data generation unit to an HMD. A sensing data reception unit receives data transmitted from the HMD, the data including size data indicating a size of the data successfully received by the HMD. A required time specification unit specifies time it took for a round-trip communication in half-duplex wireless communication between a relay apparatus and the HMD. A generation control unit controls a size of the data generated by the video data generation unit per unit time based on the specified time, the size indicated in the size data, and a given target time regarding the round-trip communication.

11 Claims, 10 Drawing Sheets

(51) Int. Cl.
*H04L 5/16* (2006.01)
*H04W 72/04* (2009.01)

(56) References Cited

U.S. PATENT DOCUMENTS

| | | | | |
|---|---|---|---|---|
| 2006/0179151 | A1* | 8/2006 | Yanamoto | H04L 12/64 |
| | | | | 709/230 |
| 2015/0187389 | A1* | 7/2015 | Horita | G11B 27/34 |
| | | | | 386/264 |
| 2016/0316239 | A1* | 10/2016 | Ohno | H04N 21/442 |
| 2016/0358381 | A1* | 12/2016 | Ui | H04B 7/26 |
| 2017/0111159 | A1* | 4/2017 | Lee | H04W 72/042 |
| 2017/0243406 | A1* | 8/2017 | Yamazaki | G02B 27/0172 |
| 2017/0339455 | A1* | 11/2017 | Aruga | G02B 27/0172 |
| 2018/0262815 | A1* | 9/2018 | Wang | H04N 21/64776 |
| 2019/0132821 | A1* | 5/2019 | Goto | H04W 72/042 |
| 2019/0356352 | A1 | 11/2019 | Miyashita | |
| 2019/0356880 | A1 | 11/2019 | Tanikawa | |
| 2019/0394462 | A1 | 12/2019 | Takeshi | |
| 2021/0058222 | A1* | 2/2021 | Tanikawa | H04N 21/436 |

FOREIGN PATENT DOCUMENTS

| | | |
|---|---|---|
| JP | 2011182262 A | 9/2011 |
| JP | 6231231 B1 | 11/2017 |
| WO | 2017179230 A1 | 10/2017 |
| WO | 2017217010 A1 | 12/2017 |

OTHER PUBLICATIONS

International Search Report for corresponding PCT Application No. PCT/JP2018/014368, 2 pages, dated May 15, 2018.
International Search Report for related PCT Application No. PCT/JP2018/014369, 2 pages, dated May 15, 2018.
International Preliminary Report on Patentability for related PCT Application No. PCT/JP2018/014369, 11 pages, dated Oct. 15, 2020.
Decision to Grant a Patent for corresponding Application JP 2020-512144, 5 pages, dated Aug. 12, 2021.
Decision to Grant a Patent for related Application JP 2020-512145, 5 pages, dated Aug. 12, 2021.

* cited by examiner

COMMUNICATION APPARATUS, GENERATED DATA SIZE CONTROL METHOD, COMMUNICATION METHOD, AND PROGRAM

TECHNICAL FIELD

The present invention relates to a communication apparatus, a generated data size control method, a communication method, and a program.

BACKGROUND ART

In recent years, a head-mounted display (HMD) that can be mounted on the head to watch a video displayed in front of the eyes is increasingly used. There is an HMD connected by wire to an entertainment apparatus that executes a program, such as a game program, and the HMD receives and displays a video generated by the entertainment apparatus.

In addition, there is an HMD that changes the video to be displayed according to the movement of the head of the user. The HMD includes, for example, a motion sensor, a camera, and the like, and the HMD generates sensing data, such as data indicating detection results of the motion sensor and images captured by the camera, and transmits the generated sensing data to the entertainment apparatus. The entertainment apparatus that has received the sensing data generates a video based on the sensing data and transmits the video to the HMD. Furthermore, the HMD displays the received video, and the user can watch the video that changes according to the movement of the head.

SUMMARY

Technical Problems

The inventors are examining to include, for example, a communication path based on half-duplex wireless communication compliant with a standard, such as wireless fidelity (Wi-Fi) (registered trademark), in a communication path between the entertainment apparatus and the HMD. In the half-duplex wireless communication, transmission of data from an apparatus on the transmission side (hereinafter, referred to as communication apparatus) to an apparatus on the reception side (hereinafter, referred to as communication partner apparatus) and transmission of data from the communication partner apparatus to the communication apparatus are alternately performed. In the example described above, the transmission of the data of the video from the entertainment apparatus to the HMD and the transmission of the sensing data from the HMD to the entertainment apparatus are alternately performed.

It is desirable that the quality of the data used in the communication partner apparatus, such as the data of the video generated by the entertainment apparatus, be as high as possible. For example, it is desirable that the image quality of the displayed video be as high as possible in the HMD used as described above. Therefore, it is desirable that the size of the data, such as the data of the video generated by the entertainment apparatus, generated per unit be as large as possible.

On the other hand, it is important to bring the time it takes for a round-trip communication closer to a given target time even by reducing the size of the data generated per unit time in order to reduce the discomfort of the user in the communication that requires promptness as described above.

Here, the time it takes for a round-trip communication can be brought closer to the given target time by controlling the size of the data generated per unit time based on the size of the data communicated in a round-trip communication and the time it took for the communication.

However, in a case where, for example, the communication environment is poor, part of the data may be missing, and the missing part may not reach the communication partner. In such a case, the time it takes for a round-trip communication may not be close to the given target time unless the size of the data successfully communicated by the communication partner is taken into account to control the size of the data generated per unit time.

The present invention has been made in view of the problems, and an object of the present invention is to provide a communication apparatus, a generated data size control method, a communication method, and a program that can bring the time it takes for a round-trip communication in half-duplex wireless communication closer to a given target time.

Solution to Problems

To solve the problems, the present invention provides a communication apparatus that performs half-duplex wireless communication with a communication partner apparatus, the communication apparatus including a transmission unit that transmits data generated by a data generation unit to the communication partner apparatus, a reception unit that receives data transmitted from the communication partner apparatus, the data including size data indicating a size of the data successfully received by the communication partner apparatus, a time specification unit that specifies time it took for a round-trip communication in the half-duplex wireless communication with the communication partner apparatus, and a generation control unit that controls a size of the data generated by the data generation unit per unit time based on the specified time, the size indicated in the size data, and a given target time regarding the round-trip communication.

In a mode of the present invention, the time specification unit specifies the time it took for the round-trip communication corresponding to time from the start of the transmission of the data to the communication partner apparatus in a first period to the end of the reception of the data transmitted by the communication partner apparatus in a second period following the first period, and the reception unit receives the size data indicating the size of the data successfully received by the communication partner apparatus in the first period.

Furthermore, in a mode of the present invention, the reception unit receives sensing data transmitted from the communication partner apparatus, the data generation unit generates data of a video, and the generation control unit controls quality of the data of the video.

Furthermore, the present invention provides another communication apparatus that performs half-duplex wireless communication with a communication partner apparatus, the communication apparatus including a reception unit that receives data from the communication partner apparatus, and a transmission unit that transmits size data indicating a size of successfully received data to the communication partner apparatus, in which the transmission unit transmits the size data even in a case where the reception of part of the data transmitted by the communication partner apparatus has failed.

Furthermore, in a mode of the present invention, the reception unit receives encoded video data from the communication partner apparatus, the communication apparatus further includes an output unit that outputs the video data to a decode unit, and for part of the video data failed to receive, the output unit outputs the video data supplemented with predetermined data to the decode unit.

Furthermore, in a mode of the present invention, the reception unit receives a plurality of packets provided with sequence numbers in one communication, and when the transmission unit successfully receives a packet with the last sequence number among the plurality of packets, the transmission unit transmits the size data in response to the reception of the plurality of packets even in a case where the reception of at least one of the plurality of packets has failed.

Furthermore, the present invention provides a generated data size control method including a step of transmitting data generated by a data generation unit to a communication partner apparatus, a step of receiving data transmitted from the communication partner apparatus, the data including size data indicating a size of the data successfully received by the communication partner apparatus, a step of specifying time it took for a round-trip communication in half-duplex wireless communication with the communication partner apparatus, and a step of controlling a size of the data generated by the data generation unit per unit time based on the specified time, the size indicated in the size data, and a given target time regarding the round-trip communication.

Furthermore, the present invention provides a communication method including a step of receiving data from a communication partner apparatus, and a step of transmitting size data indicating a size of successfully received data to the communication partner apparatus, in which in the step of transmitting the size data, the size data is transmitted even in a case where the reception of part of the data transmitted by the communication partner apparatus has failed.

Furthermore, the present invention provides a program causing a computer to execute a procedure of transmitting data generated by a data generation unit to a communication partner apparatus, a procedure of receiving data transmitted from the communication partner apparatus, the data including size data indicating a size of the data successfully received by the communication partner apparatus, a procedure of specifying time it took for a round-trip communication in half-duplex wireless communication with the communication partner apparatus, and a procedure of controlling a size of the data generated by the data generation unit per unit time based on the specified time, the size indicated in the size data, and a given target time regarding the round-trip communication.

Furthermore, the present invention provides another program including a procedure of receiving data from a communication partner apparatus, and a procedure of transmitting size data indicating a size of successfully received data to the communication partner apparatus, in which in the procedure of transmitting the size data, the size data is transmitted even in a case where the reception of part of the data transmitted by the communication partner apparatus has failed.

DESCRIPTION OF EMBODIMENTS

Hereinafter, embodiments of the present invention will be described with reference to the drawings.

Figure 1:
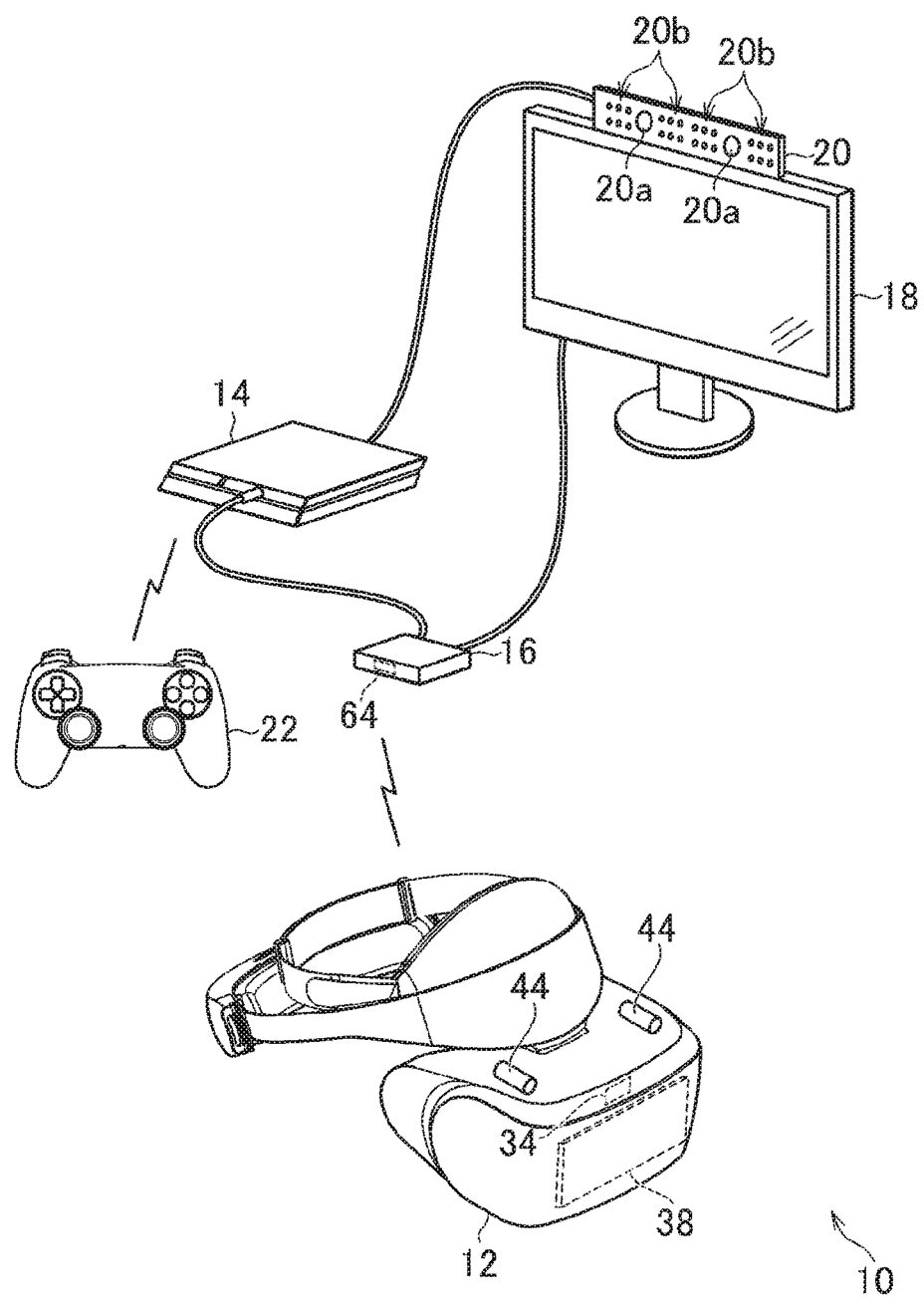
FIG. 1 is a diagram illustrating an example of an overall configuration of an entertainment system according to an embodiment of the present invention.
Figure 2A:
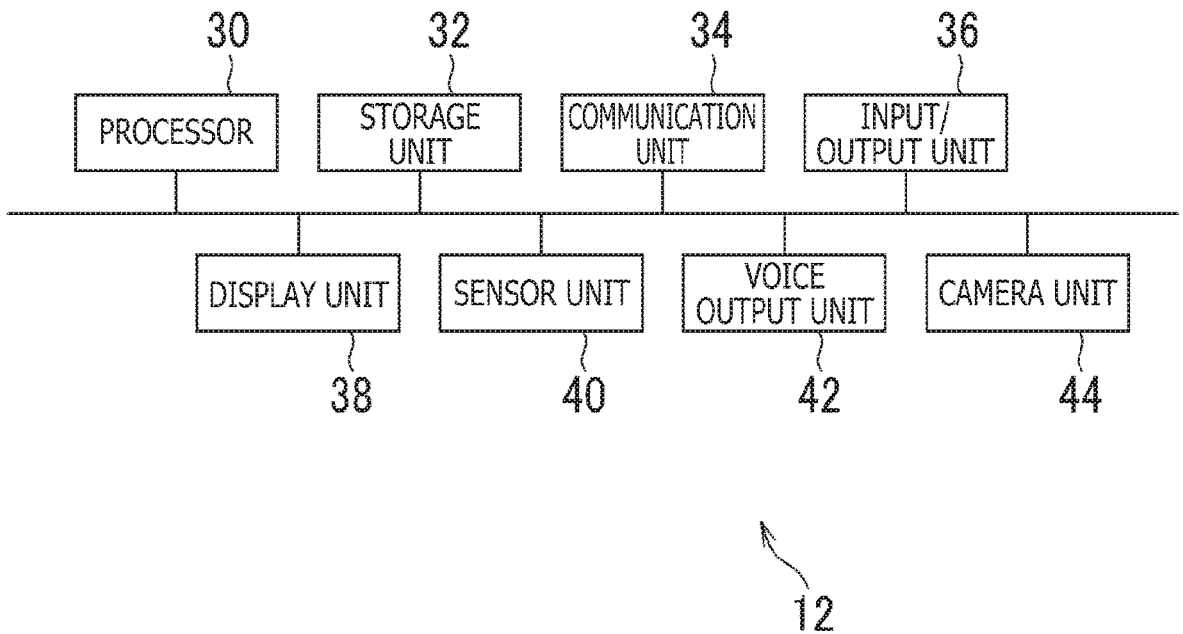
FIG. 2A is a diagram illustrating an example of a configuration of a head-mounted display according to the embodiment of the present invention.
Figure 2B:
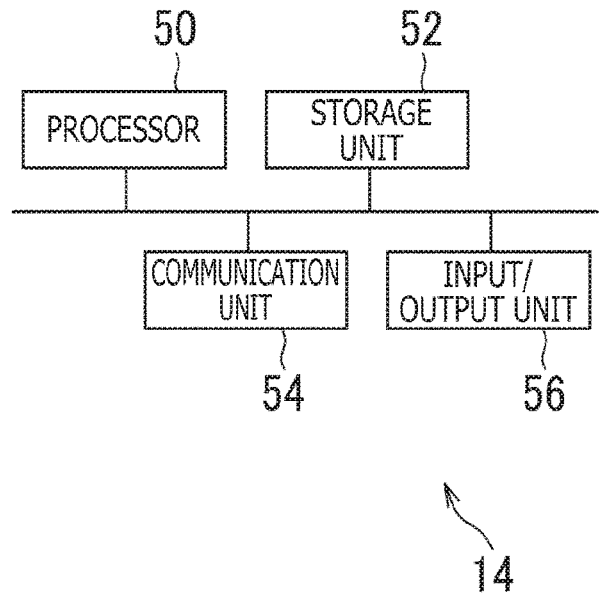
FIG. 2B is a diagram illustrating an example of a configuration of an entertainment apparatus according to the embodiment of the present invention.
Figure 2C:
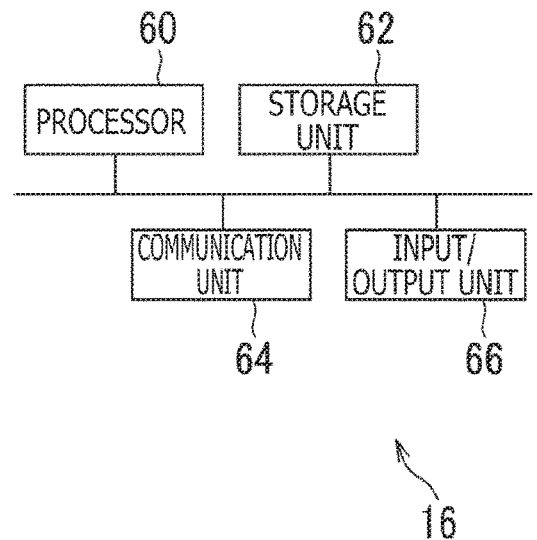
FIG. 2C is a diagram illustrating an example of a configuration of a relay apparatus according to the embodiment of the present invention.

FIG. 1 is a diagram illustrating an example of an overall configuration of an entertainment system 10 according to the embodiment of the present invention. FIG. 2A is a diagram illustrating an example of a configuration of a head-mounted display (HMD) 12 according to the present embodiment. FIG. 2B is a diagram illustrating an example of a configuration of an entertainment apparatus 14 according to the present embodiment. FIG. 2C is a diagram illustrating an example of a configuration of a relay apparatus 16 according to the present embodiment.

As illustrated in FIG. 1, the entertainment system 10 according to the present embodiment includes the HMD 12, the entertainment apparatus 14, the relay apparatus 16, a display 18, a camera microphone unit 20, and a controller 22.

As illustrated in FIG. 2A, the HMD 12 according to the present embodiment includes, for example, a processor 30, a storage unit 32, a communication unit 34, an input/output unit 36, a display unit 38, a sensor unit 40, a voice output unit 42, and camera units 44.

The processor 30 is, for example, a program control device, such as a microprocessor, that operates according to a program installed on the HMD 12. Note that in place of the processor 30, a control circuit in which the process executed by the processor 30 can be implemented may be included in the HMD 12.

The storage unit 32 is, for example, a storage element or the like, such as a read only memory (ROM) and a random access memory (RAM). A program and the like executed by the processor 30 are stored in the storage unit 32.

The communication unit 34 is, for example, a communication interface, such as a wireless local area network (LAN) module. In the present embodiment, the communication unit 34 is arranged above and in front of the HMD 12 as illustrated in FIG. 1.

The input/output unit 36 is, for example, an input/output port, such as an HDMI (registered trademark) (High-Definition Multimedia Interface) port, a universal serial bus (USB) port, and an auxiliary (AUX) port.

The display unit 38 is, for example, a display, such as a liquid crystal display and an organic EL display, arranged in front of the HMD 12, and the display unit 38 displays a video and the like generated by the entertainment apparatus 14. In addition, the display unit 38 is placed in a housing of the HMD 12. The display unit 38 may be configured to, for example, receive a video signal output by the entertainment apparatus 14 and relayed by the relay apparatus 16 and output a video indicated by the video signal. The display unit 38 according to the present embodiment can, for example, display an image for left eye and an image for right eye to display a three-dimensional image. Note that the display unit 38 may not be able to display a three-dimensional image and may be able to display only a two-dimensional image.

The sensor unit 40 is, for example, a sensor, such as a motion sensor, that can detect the acceleration and the angular velocity. The sensor unit 40 outputs detection results, such as an amount of rotation and an amount of movement of the HMD 12, to the processor 30 at a predetermined sampling rate.

The voice output unit 42 is, for example, a speaker, such as a headphone and an earphone, arranged near the ears of the user, and the voice output unit 42 outputs voice and the like indicated by voice data generated by the entertainment apparatus 14. The voice output unit 42 receives, for example, a voice signal output by the entertainment apparatus 14 and relayed by the relay apparatus 16 and outputs voice indicated by the voice signal.

The camera unit 44 is, for example, a camera such as a digital camera, and the camera unit 44 images the surroundings of the user wearing the HMD 12 at a predetermined frame rate. As illustrated in FIG. 1, two camera units 44 are arranged above the display unit 38 in the present embodiment to allow imaging the front side of the display unit 38. Therefore, the camera units 44 according to the present embodiment can image the front side of the user wearing the HMD 12. In addition, the camera unit 44 according to the present embodiment is, for example, a stereo camera including a lens for capturing an image for left eye and a lens for generating an image for right eye.

The entertainment apparatus 14 according to the present embodiment is, for example, a computer, such as a game console, a digital versatile disc (DVD) player, and a Blu-ray (registered trademark) player. The entertainment apparatus 14 according to the present embodiment generates a video or voice by, for example, executing a stored game program or reproducing content recorded in an optical disk. Furthermore, the entertainment apparatus 14 according to the present embodiment outputs the video signal representing the video to be generated or the voice signal representing the voice to be generated to the HMD 12 or the display 18 through the relay apparatus 16.

The entertainment apparatus 14 according to the present embodiment includes, for example, a processor 50, a storage unit 52, a communication unit 54, and an input/output unit 56 as illustrated in FIG. 2B.

The processor 50 is, for example, a program control device, such as a CPU, that operates according to a program installed on the entertainment apparatus 14. The processor 50 according to the present embodiment also includes a GPU (Graphics Processing Unit) that draws an image in a frame buffer based on a graphics command or data supplied from the CPU. Note that in place of the processor 50, a control circuit in which the process executed by the processor 50 can be implemented may be included in the entertainment apparatus 14.

The storage unit 52 is, for example, a storage element, such as a ROM and a RAM, a hard disk drive, or the like. A program and the like executed by the processor 50 are stored in the storage unit 52. In addition, a region of the frame buffer in which the GPU draws an image is reserved in the storage unit 52 according to the present embodiment.

The communication unit 54 is, for example, a communication interface such as a wireless LAN module.

The input/output unit 56 is an input/output port, such as an HDMI port and a USB port.

The relay apparatus 16 according to the present embodiment is a computer that relays the video signal or the voice signal output from the entertainment apparatus 14 and outputs the video signal or the voice signal to the HMD 12 or the display 18.

The relay apparatus 16 according to the present embodiment includes, for example, a processor 60, a storage unit 62, a communication unit 64, and an input/output unit 66 as illustrated in FIG. 2C.

The processor 60 is, for example, a program control device, such as a CPU, that operates according to a program installed on the relay apparatus 16. Note that in place of the processor 60, a control circuit in which the process executed by the processor 60 can be implemented may be included in the relay apparatus 16.

The storage unit 62 is, for example, a storage element or the like, such as a ROM and a RAM. A program and the like executed by the processor 60 are stored in the storage unit 62.

The communication unit 64 is, for example, a communication interface such as a wireless LAN module. In the present embodiment, the communication unit 64 is included in front of the relay apparatus 16 as illustrated in FIG. 1.

The input/output unit 66 is an input/output port, such as an HDMI port and a USB port.

The display 18 according to the present embodiment is, for example, a liquid crystal display or the like, and the display 18 displays a video or the like indicated by the video signal output from the entertainment apparatus 14.

The camera microphone unit 20 according to the present embodiment includes, for example, a camera 20a that outputs data, such as a captured image of a subject, indicating the surroundings of the camera microphone unit 20 to the entertainment apparatus 14. In addition, the camera 20a according to the present embodiment is a stereo camera. In addition, the camera microphone unit 20 according to the present embodiment includes a microphone 20b that acquires voice of the surroundings and outputs voice data of the voice to the entertainment apparatus 14 after converting the voice into the voice data.

The HMD 12 and the relay apparatus 16 can, for example, mutually transmit and receive data through wireless communication. The entertainment apparatus 14 and the relay apparatus 16 are connected through, for example, an HDMI cable, a USB cable, or the like. The relay apparatus 16 and the display 18 are connected through, for example, an HDMI cable or the like. The entertainment apparatus 14 and the camera microphone unit 20 are connected through, for example, an AUX cable or the like.

The controller 22 according to the present embodiment is an operation input apparatus for inputting operations to the entertainment apparatus 14. The user can press a direction key or a button included in the controller 22 or tilt an operation stick to thereby use the controller 22 to input various operations. In addition, the controller 22 outputs input data associated with the input of operation to the entertainment apparatus 14 in the present embodiment. In addition, the controller 22 according to the present embodiment includes a USB port. Furthermore, the controller 22 can be connected to the entertainment apparatus 14 through a USB cable to output the input data to the entertainment apparatus 14 by wire. In addition, the controller 22 according to the present embodiment includes a wireless communication module or the like, and the controller 22 can also wirelessly output the input data to the entertainment apparatus 14.

In the present embodiment, the entertainment apparatus 14 executes, for example, a program such as a game program. Furthermore, the entertainment apparatus 14 generates a video, such as a video of a three-dimensional virtual space, corresponding to the execution status of the program. The video represents, for example, a view in a gaze direction from a point of view arranged in the virtual space. Furthermore, video data representing the video generated by the entertainment apparatus 14 is transmitted from the entertainment apparatus 14 to the HMD 12 through the relay apparatus 16.

In addition, sensing data is generated in the HMD 12 in the present embodiment. Here, examples of the sensing data include data indicating detection results of the acceleration and the angular velocity detected by the sensor unit 40 and images captured by the camera units 44. Furthermore, the sensing data generated by the HMD 12 is transmitted to the entertainment apparatus 14 through the relay apparatus 16.

The entertainment apparatus 14 generates a video corresponding to the sensing data received from the HMD 12. The entertainment apparatus 14 changes, for example, the position of the point of view arranged in the virtual space and the gaze direction according to the sensing data received from the HMD 12. Furthermore, the entertainment apparatus 14 generates a video representing a view in the changed gaze direction from the position of the changed point of view and transmits the video to the HMD 12. Furthermore, the HMD 12 that has received the video causes the display unit 38 to display the video. In this way, the video displayed on the display unit 38 is changed according to the movement of the head of the user in the present embodiment.

Figure 3:
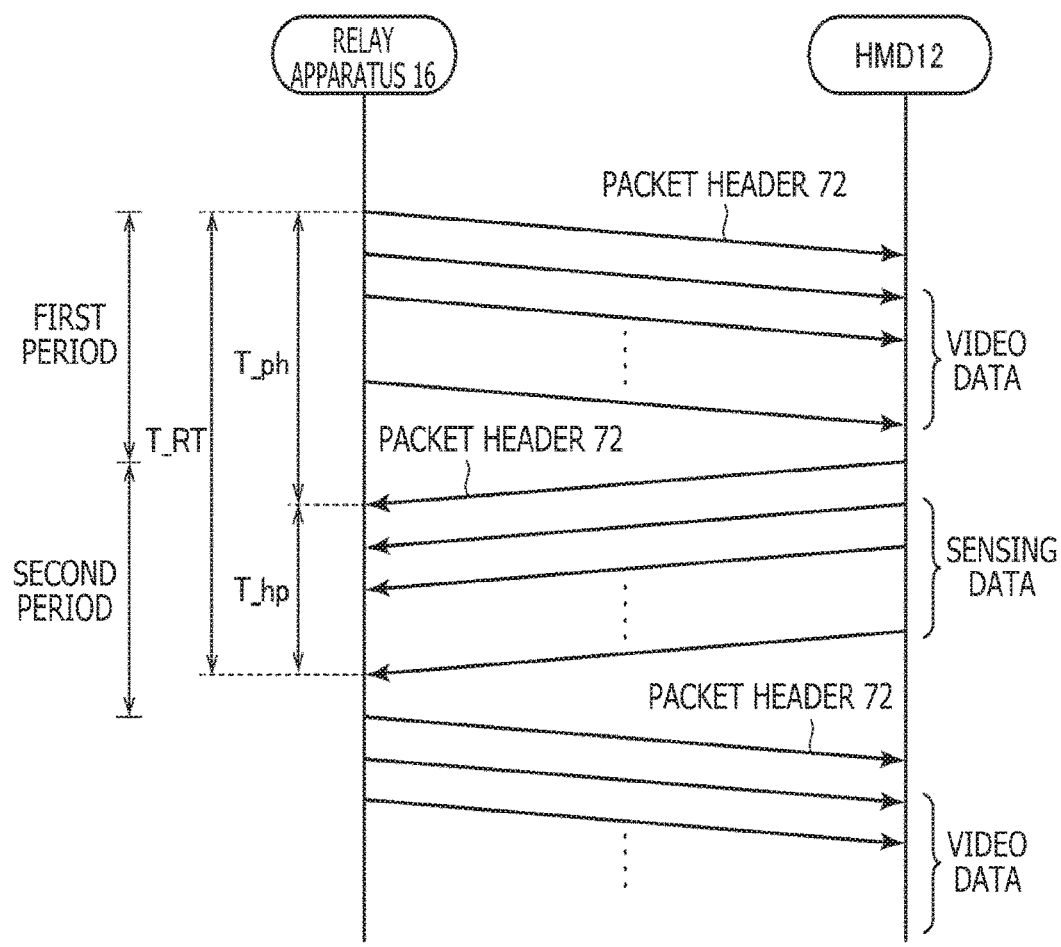
FIG. 3 is a diagram schematically illustrating an example of a state of half-duplex wireless communication between the relay apparatus and the HMD.

In the present embodiment, the relay apparatus 16 and the HMD 12 perform, for example, half-duplex wireless communication compliant with a standard such as, for example, Wi-Fi (registered trademark). FIG. 3 is a diagram schematically illustrating an example of a state of the half-duplex wireless communication between the relay apparatus 16 and the HMD 12.

As illustrated in FIG. 3, for example, transmission of video data from the relay apparatus 16 to the HMD 12 and transmission of sensing data from the HMD 12 to the relay apparatus 16 are alternately performed in the present embodiment. Hereinafter, a period in which the data is transmitted from the relay apparatus 16 to the HMD 12 will be referred to as a first period, and a period in which the data is transmitted from the HMD 12 to the relay apparatus 16 will be referred to as a second period. That is, the first period and the second period alternately come in the half-duplex wireless communication according to the present embodiment.

Figure 4:
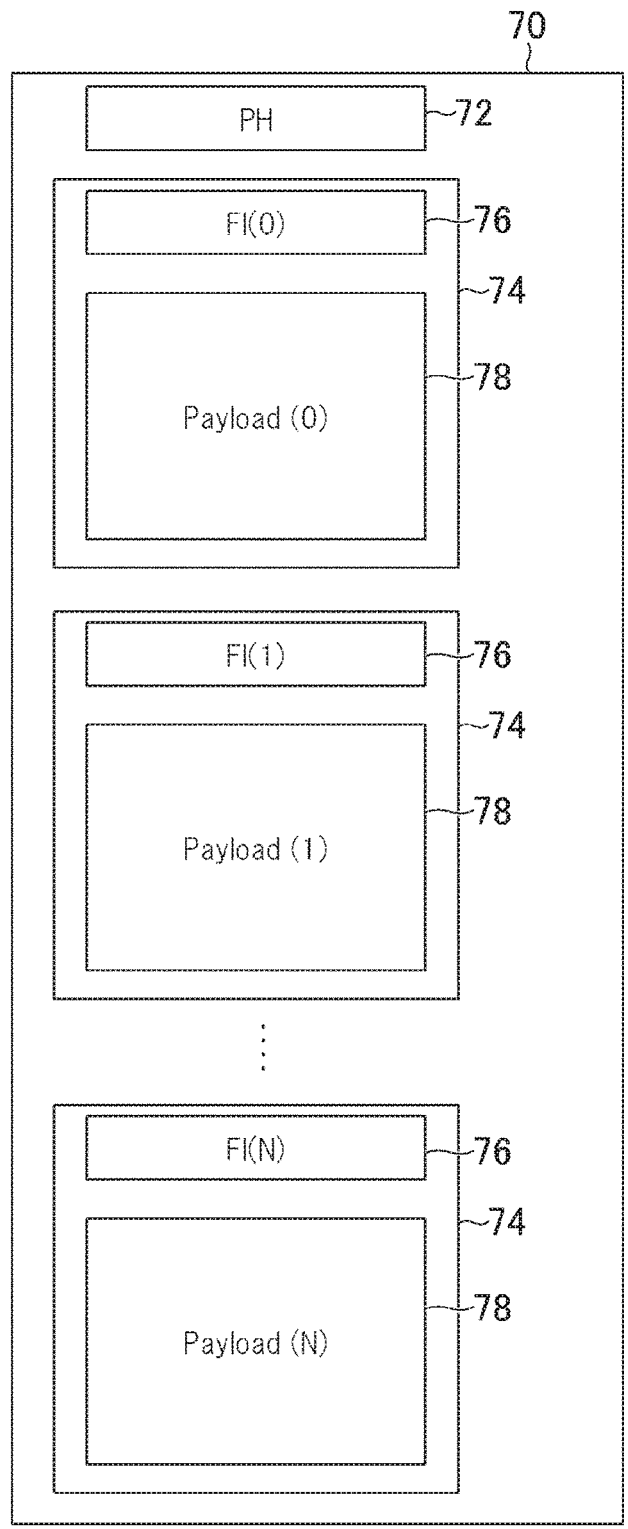
FIG. 4 is a diagram illustrating an example of a data structure of transaction data.

FIG. 4 is a diagram illustrating an example of a data structure of transaction data 70 according to the present embodiment. For example, the transaction data 70 transmitted from the relay apparatus 16 to the HMD 12 in one first period includes video data transmitted from the relay apparatus 16 to the HMD 12 in the first period. In addition, for example, the transaction data 70 transmitted from the HMD 12 to the relay apparatus 16 in one second period includes sensing data transmitted from the HMD 12 to the relay apparatus 16 in the second period.

As illustrated in FIG. 4, one piece of transaction data 70 includes one packet header 72 (expressed as PH in FIG. 4) and a plurality of divided packets 74. FIG. 4 illustrates that the transaction data 70 includes (N+1) divided packets 74. Furthermore, one divided packet 74 includes one piece of fragment information 76 (expressed as FI (0) or the like in FIG. 4) and one piece of payload data 78 (expressed as Payload (0) or the like in FIG. 4).

The packet header 72 of the transaction data 70 transmitted to the HMD 12 by the relay apparatus 16 includes, for example, a value of a bitrate that can be transmitted to the relay apparatus 16 by the HMD 12 (value PayloadBitrate_HtoP described later).

In addition, the packet header 72 of the transaction data 70 transmitted to the relay apparatus 16 by the HMD 12 includes, for example, a value indicating the size of data successfully received by the HMD 12 (value TransSize_PtoH_Act described later).

In addition, the packet header 72 also includes, for example, a sequence number of the last divided packet 74.

The fragment information 76 included in the divided packet 74 includes, for example, a sequence number of the divided packet 74 and the sequence number of the last divided packet 74 in the transaction data 70 including the divided packet 74.

The payload data 78 corresponds to, for example, the video data transmitted from the relay apparatus 16 to the HMD 12 or the sensing data transmitted from the HMD 12 to the relay apparatus 16.

Figure 5:
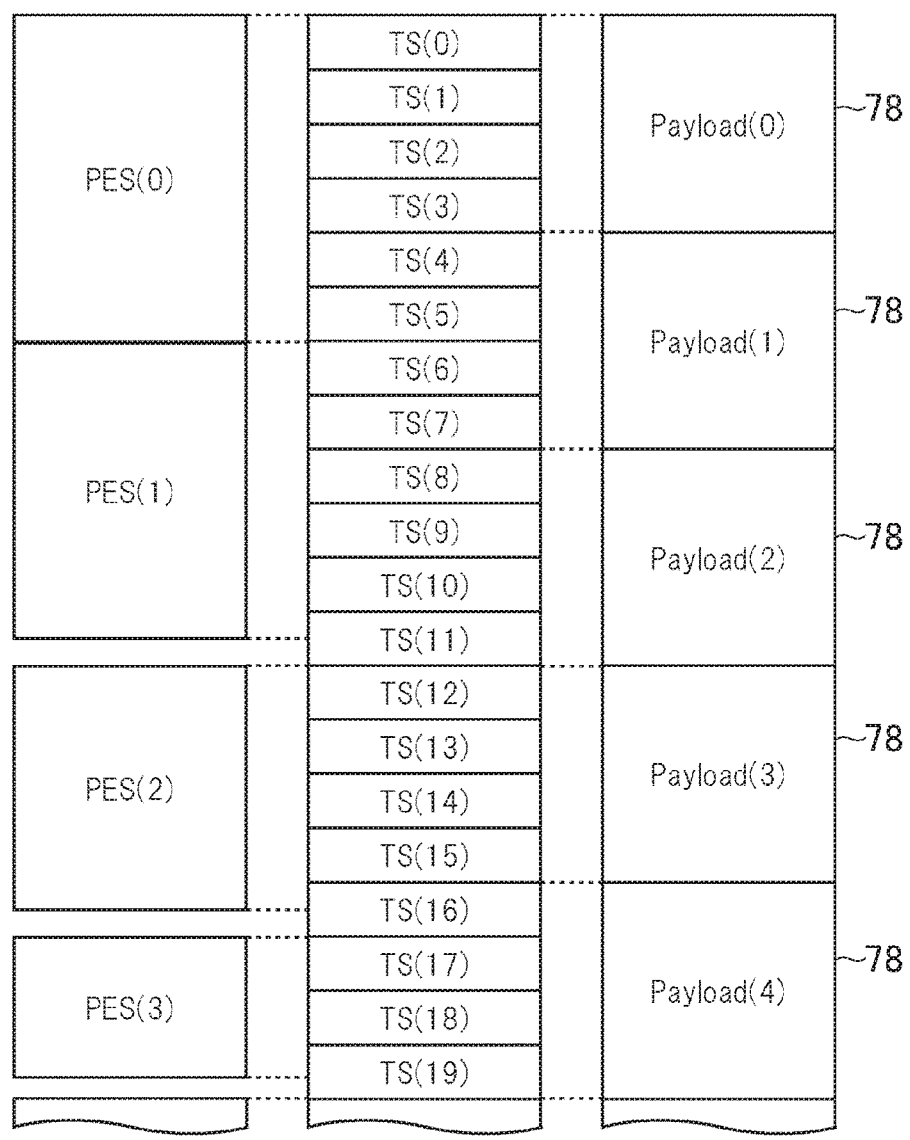
FIG. 5 is a diagram illustrating an example of a relationship between video data and payload data corresponding to the video data.

FIG. 5 is a diagram illustrating an example of a relationship between the video data transmitted from the relay apparatus 16 to the HMD 12 and the payload data 78 corresponding to the video data.

Here, the video data according to the present embodiment is encoded according to, for example, a standard of moving picture experts group (MPEG). Furthermore, the encoded video data is divided into packetized elementary streams (Packetized Elementary Stream: PES) that are variable-length packets. FIG. 5 illustrates packets of four PESs (PES(0) to PES(3)).

Furthermore, in the present embodiment, the PES is further divided into, for example, transport packets (TS), each with a fixed length of 188 bytes including a header of 4 bytes and a payload of 184 bytes.

FIG. 5 illustrates twenty TSs (TS(0) to TS(19)). The example in FIG. 5 illustrates that six TSs (TS(0) to TS(5)) are generated based on PES(0). In addition, the example illustrates that six TSs (TS(6) to TS(11)) are generated based on PES(1). In addition, the example illustrates that five TSs (TS(12) to TS(16)) are generated based on PES(2). In addition, the example illustrates that three TSs (TS(17) to TS(19)) are generated based on PES(3). Here, for a TS including a part without a corresponding PES, such as TS(11), TS(16), and TS(19), the part is padded with a predetermined value.

Pieces of payload data 78 are then generated, each corresponding to one or a plurality of TSs. The example in FIG.

5 illustrates five pieces of payload data 78 (Payload(0) to Payload(4)). The example in FIG. 5 illustrates that Payload(0) corresponds to TS(0) to TS(3). In addition, the example illustrates that Payload(1) corresponds to TS(4) to TS(7). In addition, the example illustrates that Payload(2) corresponds to TS(8) to TS(11). In addition, the example illustrates that Payload(3) corresponds to TS(12) to TS(15). In addition, the example illustrates that Payload(4) corresponds to TS(16) to TS(19). Here, the payload data 78 is always aligned with the TSs, and there is no case in which one TS is separately allocated to a plurality of pieces of payload data 78.

As illustrated in FIG. 3, the relay apparatus 16 transmits the packet header 72 to the HMD 12 and then transmits the rest of the transaction data 70 to the HMD 12 in one first period. Furthermore, in response to the reception of the transaction data 70, the HMD 12 transmits the packet header 72 to the relay apparatus 16 and then transmits the rest of the transaction data 70 to the relay apparatus 16 in one second period following the first period. Note that the relay apparatus 16 and the HMD 12 may perform communication of data other than the transaction data 70, such as voice data and a message for control.

Furthermore, in the present embodiment, the relay apparatus 16 can specify the time it took for a round-trip communication (round trip time) from the transmission of the packet header 72 of the video data to the reception of all of the sensing data transmitted in response to the reception of the video data as illustrated in FIG. 3. Hereinafter, the time will be expressed as time T_RT. Here, the time T_RT corresponds to the time it took for a round-trip communication corresponding to the time from the start of the transmission of the video data in one first period to the end of the reception of the sensing data in the second period following the first period.

Furthermore, in the present embodiment, the relay apparatus 16 can specify the time from the transmission of the packet header 72 of the video data to the reception of the packet header 72 of the sensing data transmitted from the HMD 12 in response to the end of the reception of the video data as illustrated in FIG. 3. The time substantially corresponds to the time it took for the transmission of the video data from the relay apparatus 16 to the HMD 12. Hereinafter, the time will be expressed as time T_ph. In addition, the time obtained by subtracting the time T_ph from the time T_RT substantially corresponds to the time it took for the transmission of the sensing data from the HMD 12 to the relay apparatus 16. Hereinafter, the time will be expressed as time T_hp.

Furthermore, a given target time regarding a round-trip communication in the half-duplex wireless communication is set in advance in the present embodiment. Hereinafter, the target time will be expressed as time TargetTransferTime.

It is desirable that the quality of the data used in the HMD 12 be as high as possible like video data according to the present embodiment. Therefore, it is desirable that the size of the data generated by the entertainment apparatus 14 per unit time be as large as possible. On the other hand, it is important to bring the round trip time closer to the time TargetTransferTime even by reducing the size of the data generated per unit time in order to reduce the discomfort of the user in the communication that requires promptness as in the present embodiment. For example, it is important to reduce the latency of each frame image included in the video displayed by the HMD 12.

Considering the above, the size of the data generated by the entertainment apparatus 14 per unit time is controlled as follows in the present embodiment so that the time T_RT becomes equal to or smaller than the time TargetTransferTime as much as possible.

Furthermore, in a case where, for example, the communication environment is poor, part of the data may be missing, and the missing part may not reach the communication partner. For example, one or a plurality of divided packets 74 may not reach the communication partner.

In such a case, the time it takes for a round-trip communication may not be close to the given target time unless the size of the data successfully communicated by the communication partner is taken into account to control the size of the data generated per unit time.

Therefore, in the present embodiment, the size of the data generated per unit time is controlled as follows based on the size of the data successfully communicated by the communication partner.

In addition, when part of the data transmitted from the relay apparatus 16 to the HMD 12 is missing, the relay apparatus 16 cannot calculate the time T_RT unless the sensing data is transmitted from the HMD 12 to the relay apparatus 16. As a result, the size of the data to be generated by the entertainment apparatus 14 per unit time cannot be calculated.

Therefore, in the present embodiment, the sensing data is transmitted from the HMD 12 to the relay apparatus 16 as follows even when part of the data transmitted from the relay apparatus 16 to the HMD 12 is missing.

Figure 6:
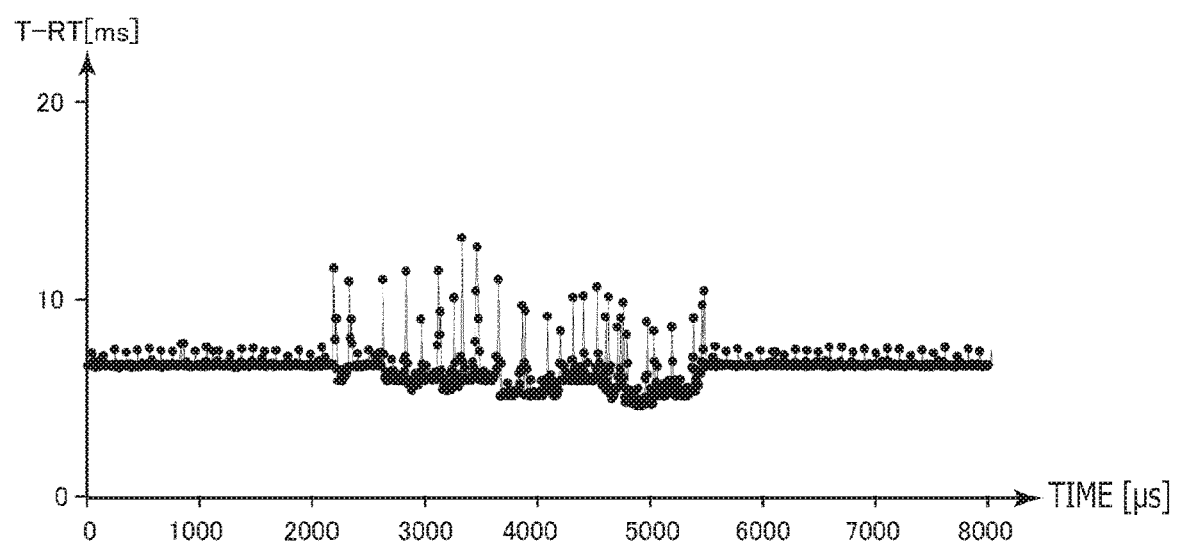
FIG. 6 is a diagram illustrating an example of change in time T_RT specified in each round-trip communication.

In addition, when, for example, the communication environment is deteriorated, a communication path search process based on beamforming or the like may occur, and the communication environment may become unstable. FIG. 6 is a diagram illustrating an example of change in the time T_RT specified in each round-trip communication. In the example of FIG. 6, beamforming is intermittently and continuously occurring in the communication path search process. In the example of FIG. 6, the time T_RT significantly fluctuates in a range of time from approximately 2000 microseconds to 5500 microseconds. Under the circumstances, even if, for example, the size of the data generated per unit time is controlled to be large based on the fact that the time T_RT is shorter than the target time, the communication of a large size of data may not be possible in the next round-trip communication. Therefore, in such a situation, it is desirable not to significantly increase the size of the data generated per unit time even in the case where the time T_RT is shorter than the target time.

Considering the above, in the present embodiment, the magnitude of change in the value corresponding to the size of the data generated per unit time corresponds to the result of estimation of whether or not the communication path search process is occurring as described below.

Conversely, in the situation described above, communication of data in a shorter time than the target time may be possible in the next round-trip communication when, for example, the size of the data generated per unit time is controlled to be small based on the fact that the time T_RT is longer than the target time. If the next round-trip communication is immediately started in such a case, the video data may not be generated in time, and empty video data may be transmitted from the relay apparatus 16 to the HMD 12. The transmission of empty data is a waste of power consumption.

Considering the above, the present embodiment can suppress the waste of power consumption as follows.

Here, the functions of the entertainment system 10 according to the present embodiment and the process executed by the entertainment system 10 according to the present embodiment will be further described, mostly in relation to the matters described above.

Figure 7:
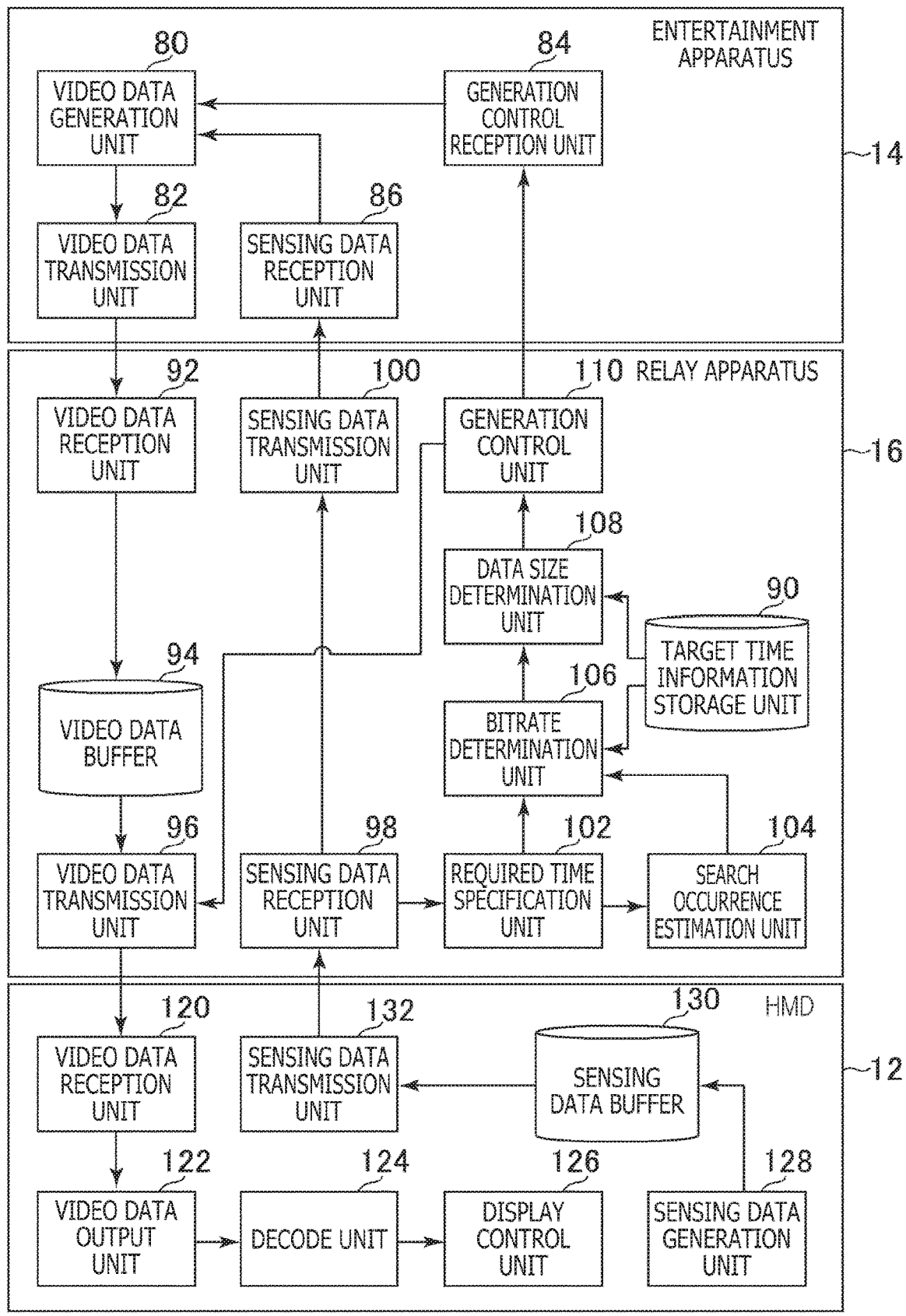
FIG. 7 is a functional block diagram illustrating an example of functions implemented in the head-mounted display, the entertainment apparatus, and the relay apparatus according to the embodiment of the present invention.

FIG. 7 is a functional block diagram illustrating an example of functions implemented in the HMD 12, the entertainment apparatus 14, and the relay apparatus 16 according to the present embodiment. Note that not all of the functions illustrated in FIG. 7 need to be implemented in the entertainment system 10 according to the present embodiment, and functions other than the functions illustrated in FIG. 7 may also be implemented.

As illustrated in FIG. 7, the entertainment apparatus 14 according to the present embodiment has functions including, for example, a video data generation unit 80, a video data transmission unit 82, a generation control reception unit 84, and a sensing data reception unit 86. The master unit of the video data generation unit 80 is the processor 50. The master unit of the video data transmission unit 82, the generation control reception unit 84, and the sensing data reception unit 86 is the input/output unit 56.

A program that is installed on the entertainment apparatus 14 as a computer and that includes instructions corresponding to the functions may be executed by the processor 50 to implement the functions. The program may be supplied to the entertainment apparatus 14 through a computer-readable information storage medium, such as an optical disk, a magnetic disk, a magnetic tape, a magneto-optical disk, and a flash memory, or through the Internet or the like.

In addition, as illustrated in FIG. 7, the relay apparatus 16 according to the present embodiment has functions including, for example, a target time information storage unit 90, a video data reception unit 92, a video data buffer 94, a video data transmission unit 96, a sensing data reception unit 98, a sensing data transmission unit 100, a required time specification unit 102, a search occurrence estimation unit 104, a bitrate determination unit 106, a data size determination unit 108, and a generation control unit 110. The master unit of the target time information storage unit 90 and the video data buffer 94 is the storage unit 62. The master unit of the video data reception unit 92 and the sensing data transmission unit 100 is the input/output unit 66. The master unit of the video data transmission unit 96 and the sensing data reception unit 98 is the communication unit 64. The master unit of the required time specification unit 102, the search occurrence estimation unit 104, the bitrate determination unit 106, and the data size determination unit 108 is the processor 60. The master units of the generation control unit 110 are the processor 60 and the input/output unit 66.

A program that is installed on the relay apparatus 16 as a computer and that includes instructions corresponding to the functions may be executed by the processor 60 to implement the functions. The program may be supplied to the relay apparatus 16 through a computer-readable information storage medium, such as an optical disk, a magnetic disk, a magnetic tape, a magneto-optical disk, and a flash memory, or through the Internet or the like.

In addition, as illustrated in FIG. 7, the HMD 12 according to the present embodiment has functions including, for example, a video data reception unit 120, a video data output unit 122, a decode unit 124, a display control unit 126, a sensing data generation unit 128, a sensing data buffer 130, and a sensing data transmission unit 132. The master unit of the video data reception unit 120 and the sensing data transmission unit 132 is the communication unit 34. The master unit of the video data output unit 122 and the decode unit 124 is the processor 30. The master units of the display control unit 126 are the processor 30 and the display unit 38.

The master units of the sensing data generation unit 128 are the processor 30, the sensor unit 40, and the camera units 44. The master unit of the sensing data buffer 130 is the storage unit 32.

A program that is installed on the HMD 12 as a computer and that includes instructions corresponding to the functions may be executed by the processor 30 to implement the functions. The program may be supplied to the HMD 12 through a computer-readable information storage medium, such as an optical disk, a magnetic disk, a magnetic tape, a magneto-optical disk, and a flash memory, or through the Internet or the like.

The video data generation unit 80 generates, for example, video data representing the video to be displayed on the display unit 38 of the HMD 12 in the present embodiment.

The video data transmission unit 82 transmits, for example, the video data generated by the video data generation unit 80 to the relay apparatus 16 in the present embodiment.

The generation control reception unit 84 receives, for example, generation control information transmitted by the relay apparatus 16 in the present embodiment. Here, the generation control information is, for example, information indicating the size of the data to be generated per unit time. The video data generation unit 80 is controlled to generate the data of the size indicated in the generation control information per unit time in response to the reception of the generation control information by the generation control reception unit 84.

The sensing data reception unit 86 receives, for example, sensing data, such as data indicating detection results of the sensor unit 40 of the HMD 12 and images captured by the camera units 44, from the relay apparatus 16 in the present embodiment. In the present embodiment, the video data generation unit 80 generates video data corresponding to the sensing data received by the sensing data reception unit 86.

The target time information storage unit 90 stores, for example, target time information in which the value of the target time TargetTransferTime is set in the present embodiment.

The video data reception unit 92 receives, for example, video data transmitted from the entertainment apparatus 14 in the present embodiment.

The video data buffer 94 stores, for example, the video data received by the video data reception unit 92 in the present embodiment.

The video data transmission unit 96 transmits, for example, the video data generated by the video data generation unit 80 to the HMD 12 in the present embodiment. For example, the video data transmission unit 96 transmits the video data stored in the video data buffer 94 to the HMD 12.

The sensing data reception unit 98 receives, for example, sensing data transmitted by the HMD 12 in the present embodiment.

The sensing data transmission unit 100 transmits, for example, the sensing data received by the sensing data reception unit 98 to the entertainment apparatus 14 in the present embodiment.

The required time specification unit 102 specifies, for example, the time T_RT it took for a round-trip communication in the half-duplex wireless communication between the relay apparatus 16 and the HMD 12 in response to the end of the round-trip communication in the present embodiment.

The search occurrence estimation unit 104 estimates whether or not a communication path search process is occurring between the relay apparatus 16 and the HMD 12. Here, the communication path search process may include continuously occurring beamforming.

In addition, the search occurrence estimation unit 104 may also determine an evaluation value regarding whether or not the communication path search process is occurring based on the length of the time T_RT. Here, an example of the evaluation value includes a value obtained by subtracting a given value THR_INT described later from the value indicating the time T_RT.

Note that the details of the estimation by the search occurrence estimation unit 104 will be described later.

The bitrate determination unit 106 determines, for example, a bitrate that can be transmitted to the HMD 12 by the relay apparatus 16 in a later round-trip communication in the present embodiment. Here, the bitrate may be determined based on, for example, the specified time T_RT, the size of the data communicated with the HMD 12 in a round-trip communication, and the given target time TargetTransferTime regarding a round-trip communication. In addition, the bitrate determination unit 106 may determine a bitrate that can be transmitted to the relay apparatus 16 by the HMD 12.

Hereinafter, the value of the bitrate that can be transmitted to the HMD 12 by the relay apparatus 16 will be expressed as PayloadBitrate_PtoH. In addition, the value of the bitrate that can be transmitted to the relay apparatus 16 by the HMD 12 will be expressed as PayloadBitrate_HtoP. The value PayloadBitrate_HtoP may be included in the packet header 72 of the transaction data 70 transmitted to the HMD 12 by the relay apparatus 16 as described above. Here, the bitrate determination unit 106 may hold the determined value PayloadBitrate_PtoH. In addition, the bitrate determination unit 106 may hold the determined value PayloadBitrate_HtoP.

In addition, the bitrate determination unit 106 may hold, for example, information indicating the maximum value and the minimum value of the bitrate that can be transmitted to the HMD 12 by the relay apparatus 16, the values corresponding to the specifications of the entertainment apparatus 14 and the relay apparatus 16. In addition, the bitrate determination unit 106 may hold, for example, information indicating the maximum value and the minimum value of the bitrate that can be transmitted to the relay apparatus 16 by the HMD 12, the values corresponding to the specification of the HMD 12. Hereinafter, the maximum value and the minimum value of the bitrate that can be transmitted to the HMD 12 by the relay apparatus 16 will be expressed as Tp_PtoH_ReqMax and Tp_PtoH_ReqMin, respectively. In addition, the maximum value and the minimum value of the bitrate that can be transmitted to the relay apparatus 16 by the HMD 12 will be expressed as Tp_HtoP_ReqMax and Tp_HtoP_ReqMin, respectively.

Here, for the value Tp_PtoH_ReqMax, it is desirable to set a value indicating, for example, a bitrate that can secure a communication band of video data with the highest quality satisfying the specifications of the HMD 12 and the relay apparatus 16 and fixed data that is not a control target of the amount of data (for example, voice data, control message, and the like). In addition, for the value Tp_HtoP_ReqMax, it is desirable to set a value indicating a bitrate that can secure a communication band of sensing data with the highest quality satisfying the specifications of the HMD 12 and the relay apparatus 16 and fixed data that is not a control target of the amount of data (for example, voice data, control message, and the like).

In addition, for the value Tp_PtoH_ReqMin, it is desirable to set a value indicating, for example, a bitrate that can secure a communication band of video data with the minimum required quality satisfying the specifications of the HMD 12 and the relay apparatus 16 and fixed data that is not a control target of the amount of data (for example, voice data, control message, and the like). In addition, for the value Tp_HtoP_ReqMin, it is desirable to set a value indicating, for example, a bitrate that can secure a communication band of sensing data with the minimum required quality satisfying the specifications of the HMD 12 and the relay apparatus 16 and fixed data that is not a control target of the amount of data (for example, voice data, control message, and the like).

Note that the details of the determination method of the bitrate will be described later.

The data size determination unit 108 determines, for example, the size of the data to be transmitted to the HMD 12 by the relay apparatus 16 in a later round-trip wireless communication performed with the HMD 12 in the present embodiment. Here, the size of the data to be transmitted to the HMD 12 by the relay apparatus 16 in a later round-trip wireless communication may be determined based on, for example, the bitrate determined by the bitrate determination unit 106 and the given target time TargetTransferTime. In addition, the data size determination unit 108 may determine the size of the data to be transmitted to the relay apparatus 16 by the HMD 12 in a later round-trip wireless communication. Hereinafter, the size of the data transmitted to the HMD 12 by the relay apparatus 16 in a round-trip wireless communication will be expressed as TransSize_PtoH. In addition, the size of the data transmitted to the relay apparatus 16 by the HMD 12 in a round-trip wireless communication will be expressed as TransSize_HtoP.

In addition, the data size determination unit 108 may hold information including the value TransSize_PtoH of the size of the data transmitted to the HMD 12 by the relay apparatus 16 in a round-trip wireless communication determined as described above. In addition, the data size determination unit 108 may hold information including the value TransSize_HtoP of the size of the data transmitted to the relay apparatus 16 by the HMD 12 in a round-trip wireless communication determined as described above.

The generation control unit 110 controls, for example, the size of the data generated by the video data generation unit 80 per unit time in the present embodiment. Here, the size may be determined based on the time T_RT, the size of the data communicated with the HMD 12 in a round-trip communication, and the given target time TargetTransferTime regarding a round-trip communication. In addition, the size may be determined according to the bitrate determined by the bitrate determination unit 106. For example, the generation control unit 110 may control the video data generation unit 80 to generate the data of the size corresponding to the determined bitrate per unit time. In addition, the generation control unit 110 may transmit generation control information indicating the size to the entertainment apparatus 14.

In addition, the generation control unit 110 may control the quality, such as resolution and compression ratio, of the data of the video generated by the video data generation unit 80 according to the bitrate determined by the bitrate determination unit 106.

The accuracy of the sensing data becomes poor if the size of the sensing data transmitted from the HMD 12 to the relay apparatus 16 in a round-trip communication is reduced. Therefore, it is not desirable to reduce the size of the sensing data. On the other hand, reduction in the quality of the data of the video to be displayed is not really a big problem. Therefore, in a case where the bitrate that can be transmitted to the HMD 12 by the relay apparatus 16 is reduced, the quality, such as compression ratio and resolution, of the video to be generated can be reduced to prevent the occurrence of latency, and the accuracy of the sensing data can be secured.

The video data reception unit 120 receives, for example, the video data transmitted from the relay apparatus 16 in the present embodiment.

The video data output unit 122 outputs, for example, the video data received by the video data reception unit 120 to the decode unit 124 in the present embodiment.

Here, in a case where the relay apparatus 16 fails to receive part of the video data transmitted by the relay apparatus 16, the video data output unit 122 may output, to the decode unit 124, video data supplemented with predetermined data, such as NULL TS, for the part.

Missing of data in the present embodiment occurs on the basis of divided packets 74. Here, it is assumed that, for example, the HMD 12 fails to receive the divided packet 74 including Payload(1) illustrated in FIGS. 4 and 5. In this case, the video data output unit 122 outputs, to the decode unit 124, video data in which the part corresponding to TS(4) to TS(7) is supplemented with predetermined data such as NULL TS.

The decode unit 124 decodes, for example, the video data received from the video data output unit 122 in the present embodiment. Here, the PES is generated based on, for example, the video data received from the video data output unit 122.

Here, in generating the PES in the decoding by the decode unit 124, the decoding fails in a case where the TS to be included in the PES includes TS supplemented with predetermined data such as NULL TS. In this case, the PES is not generated. For example, it is assumed that the part corresponding to TS(4) and TS(5) is supplemented with predetermined data, such as NULL TS, as described above. In this case, the decode unit 124 fails to generate PES(0) including TS(4) and TS(5) as parts. In addition, it is assumed that, for example, the part corresponding to TS(6) and TS(7) is supplemented with predetermined data such as NULL TS. In this case, the decode unit 124 fails to generate PES(1) including TS(6) and TS(7) as parts.

The display control unit 126 displays, for example, a video indicated by the video data received by the video data reception unit 120 in the present embodiment. Here, the display control unit 126 may display, for example, a video indicated by the video data decoded by the decode unit 124. Here, the part of the screen associated with the PES for which the decode unit 124 fails to decode may not be updated, and the same image (part of the frame image) as the frame immediately before may be displayed. For example, in the case where the decode unit 124 fails to decode PES(0) and PES(1) as described above, the part of the screen associated with PES(0) and PES(1) may not be updated, and the same image as the frame immediately before may be displayed.

The sensing data generation unit 128 generates, for example, sensing data, such as data indicating the detection results of the sensor unit 40 of the HMD 12 and images captured by the camera unit 44, in the present embodiment. In addition, the sensing data generation unit 128 may hold target time information in which the value of the target time TargetTransferTime is set.

The sensing data buffer 130 stores, for example, the sensing data generated by the sensing data generation unit 128 in the present embodiment.

The sensing data transmission unit 132 transmits the sensing data stored in the sensing data buffer 130 to the relay apparatus 16.

As described above, the size of the data generated per unit time may be controlled based on, for example, the size of the data successfully communicated by the HMD 12 as a communication partner of the relay apparatus 16 in the present embodiment.

Here, for example, the value indicating the size of the data successfully received by the HMD 12 in a round-trip communication will be expressed as TransSize_PtoH_Act. In addition, the value indicating the size of the data successfully received by the relay apparatus 16 in a round-trip communication will be expressed as TransSize_HtoP_Act. Here, for example, the value TransSize_PtoH_Act may indicate the size of the data successfully received by the HMD 12 in one first period. In addition, the value TransSize_HtoP_Act may indicate the size of the data successfully received by the relay apparatus 16 in one second period following the first period.

Here, for example, the sensing data transmission unit 132 of the HMD 12 may specify the size of the data successfully received by the HMD 12. Furthermore, the sensing data transmission unit 132 of the HMD 12 may transmit size data indicating the specified size to the relay apparatus 16. Furthermore, the generation control unit 110 of the relay apparatus 16 may control the size of the data generated by the video data generation unit 80 per unit time based on the size indicated in the size data.

Specifically, for example, the sensing data transmission unit 132 of the HMD 12 may transmit, to the relay apparatus 16, the transaction data 70 including the value TransSize_PtoH_Act in the packet header 72. Furthermore, the generation control unit 110 of the relay apparatus 16 may control the size of the data generated by the video data generation unit 80 per unit time based on the value TransSize_PtoH_Act included in the packet header 72.

Here, the sensing data transmission unit 132 may transmit, to the relay apparatus 16, the transaction data 70 including the value TransSize_PtoH_Act in the packet header 72 even in the case where the HMD 12 fails to receive part of the data transmitted by the relay apparatus 16.

In addition, it is assumed that, for example, the HMD 12 has successfully received the divided packets 74 including the fragment information 76 provided with the last sequence number of the transaction data 70 including the plurality of divided packets 74 provided with the sequence numbers in one communication. In this case, the sensing data transmission unit 132 may transmit, to the relay apparatus 16, the transaction data 70 including the value TransSize_PtoH_Act in the packet header 72.

In addition, the bitrate determination unit 106 of the relay apparatus 16 may determine the bitrate that can be transmitted to the HMD 12 by the relay apparatus 16 based on the time T_RT, the value TransSize_PtoH_Act, and the target time TargetTransferTime.

In addition, the data size determination unit 108 of the relay apparatus 16 may determine the size of the data generated by the video data generation unit 80 per unit time based on, for example, the time T_RT, the value TransSize_PtoH_Act, and the target time TargetTransferTime.

In addition, as described above, the magnitude of change in the value corresponding to the size of the data generated per unit time may correspond to, for example, the result of the estimation of whether or not the communication path search process is occurring in the present embodiment.

For example, the bitrate determination unit 106 may change the value corresponding to the size of the data generated by the video data generation unit 80 per unit time determined based on the time T_RT and the target time TargetTrasferTime so that the magnitude of change in value corresponds to the result of the estimation of whether or not the communication path search process is occurring.

Here, the value to be determined may be changed so that, for example, the magnitude of change in value corresponds to the total of evaluation values determined by the search occurrence estimation unit 104 in a plurality of most recent times of round-trip communication.

Here, when, for example, the size of the data generated by the video data generation unit 80 per unit time increases, the value to be determined may be changed so that the change in the case where it is estimated that the communication path search process is occurring is smaller than the change in the case where it is estimated that the communication path search process is not occurring.

In addition, when, for example, the size of the data generated by the video data generation unit 80 per unit time decreases, the value to be determined may be changed so that the change in the case where it is estimated that the communication path search process is occurring is larger than the change in the case where it is estimated that the communication path search process is not occurring.

In this way, missing of data can be reduced even if the communication environment becomes unstable due to the occurrence of the communication path search process.

Furthermore, in a case where, for example, the time T_RT it took for a round-trip communication is shorter than a given lower limit time, the generation control unit 110 may perform control not to transmit the data generated by the video data generation unit 80 until the lower limit time has passed from the start of the round-trip communication. Here, for example, the generation control unit 110 may control the video data transmission unit 96 of the relay apparatus 16 not to transmit the data generated by the video data generation unit 80.

Here, the lower limit time may be a time shorter than the target time TargetTransferTime.

This can suppress a waste of power consumption caused by the transmission of empty data.

Note that the video data may be transmitted from the entertainment apparatus 14 to the relay apparatus 16 or from the relay apparatus 16 to the HMD 12 in the format of the transaction data 70 illustrated in FIG. 4. In this case, the transaction data 70 corresponding to the video data is generated by the video data generation unit 80. In addition, the generation control unit 110 controls the size of the transaction data 70 to be generated by the video data generation unit 80 per unit time.

In addition, the sensing data may be transmitted from the HMD 12 to the relay apparatus 16 or from the relay apparatus 16 to the entertainment apparatus 14 in the format of the transaction data 70 illustrated in FIG. 4. In this case, the transaction data 70 corresponding to the sensing data is generated by the sensing data generation unit 128.

Figure 8:
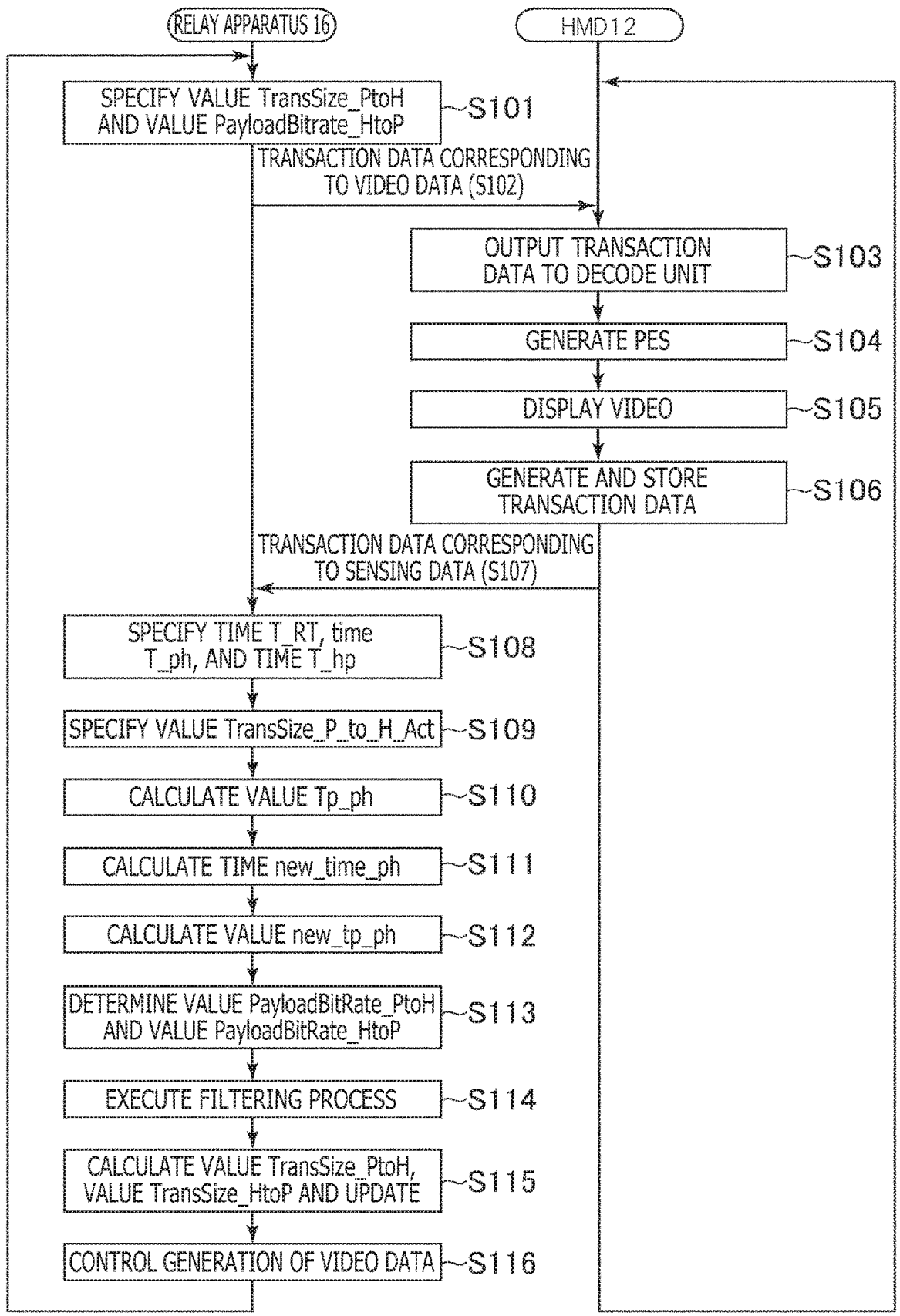
FIG. 8 is a flow chart illustrating an example of a flow of a process executed in the relay apparatus and the head-mounted display according to the embodiment of the present invention.

Hereinafter, an example of a flow of a control process of the size of the video data generated per unit time in the entertainment apparatus 14 executed by the relay apparatus 16 and the HMD 12 according to the present embodiment will be described with reference to a flow chart illustrated in FIG. 8. In the processing example illustrated in FIG. 8, the following loop of process illustrated in S101 to S116 is repeatedly executed. In addition, the process illustrated in S101 to S116 is executed once in response to execution of a round-trip communication between the relay apparatus 16 and the HMD 12.

First, the video data transmission unit 96 of the relay apparatus 16 specifies the value TransSize_PtoH set in the information held by the data size determination unit 108 and the value PayloadBitrate_HtoP held by the bitrate determination unit 106 (S101).

Furthermore, the video data transmission unit 96 of the relay apparatus 16 acquires, from the video data buffer 94, the transaction data 70 of the size indicated by the value specified in the process illustrated in S101 and transmits the transaction data 70 to the HMD 12. Consequently, the video data reception unit 120 of the HMD 12 receives the transaction data 70 (S102). The transaction data 70 corresponds to the video data. Here, for example, the video data transmission unit 96 sets, in the packet header 72, the value PayloadBitrate_HtoP specified in the process illustrated in S101 and then transmits the transaction data 70 including the packet header 72 and corresponding to the video data.

Furthermore, the video data output unit 122 of the HMD 12 outputs the transaction data 70 received in the process illustrated in S102 to the decode unit 124 (S103). Here, for example, the video data output unit 122 supplements the data with predetermined data, such as NULL TS, for the TS failed to receive and then outputs the transaction data 70 to the decode unit 124.

Furthermore, the decode unit 124 of the HMD 12 decodes the transaction data 70 received in the process illustrated in S103 to generate the PES (S104). Here, for example, the PES including the TS supplemented with the predetermined data, such as NULL TS, is not generated.

Furthermore, the display control unit 126 of the HMD 12 causes the display unit 38 of the HMD 12 to display the video corresponding to the PES generated in the process illustrated in S104 (S105). Here, the displayed image is not updated for the part of the screen corresponding to the PES not generated.

Furthermore, the sensing data generation unit 128 of the HMD 12 generates the transaction data 70 corresponding to the sensing data and causes the sensing data buffer 130 to store the transaction data 70 (S106). Here, for example, the transaction data 70 of the size corresponding to the value PayloadBitrate_HtoP set in the packet header 72 of the transaction data 70 received in the process illustrated in S102 is generated per unit time (for example, per second).

Furthermore, the sensing data transmission unit 132 of the HMD 12 transmits, to the relay apparatus 16, the transaction data 70 stored in the sensing data buffer 130 in the process illustrated in S106. Furthermore, the sensing data reception unit 98 of the relay apparatus 16 receives the transaction data 70 (S107).

Here, the value TransSize_HtoP may be calculated based on the value PayloadBitrate_HtoP set in the packet header 72 of the transaction data 70 received in the process illustrated in S102. For example, the value PayloadBitrate_HtoP may be multiplied by the target time TargetTransferTime and divided by 8, and the obtained value may be set as the value TransSize_HtoP. Furthermore, the transaction data 70 of the size corresponding to the calculated value TransSize_HtoP may be acquired from the sensing data buffer 130, and the acquired transaction data 70 may be transmitted. Note that it is assumed here that the unit of the value TransSize_HtoP is byte, and the unit of the value PayloadBitrate_HtoP is bit. Therefore, the process of dividing the value by 8 is executed to convert bits into bytes.

In addition, here, the sensing data transmission unit 132 sets, in the packet header 72, the value TransSize_PtoH_Act indicating the size of the transaction data 70 successfully received by the HMD 12 and then transmits, to the relay apparatus 16, the transaction data 70 including the packet header 72 and corresponding to the sensing data, for example.

Furthermore, in the case where the sensing data reception unit 98 of the relay apparatus 16 fails to receive part of the sensing data, the sensing data reception unit 98 may supplement the part with predetermined data such as NULL TS.

Furthermore, the required time specification unit 102 of the relay apparatus 16 specifies the time T_RT, the time T_ph, and the time T_hp (S108).

Furthermore, the bitrate determination unit 106 of the relay apparatus 16 specifies the value TransSize_PtoH_Act set in the packet header 72 of the transaction data 70 received in the process illustrated in S107 (S109).

Furthermore, the bitrate determination unit 106 of the relay apparatus 16 multiplies the value TransSize_PtoH_Act specified in the process illustrated in S109 by 8 and divides the value by the time T_ph specified in the process illustrated in S108 to thereby calculate a value Tp_ph of the amount of data transmission (throughput) per unit time (S110). Note that it is assumed here that the unit of the value TransSize_PtoH_Act is byte, and the unit of the value Tp_ph is bit. Therefore, the process of multiplying the value by 8 is executed in the process illustrated in S110 to convert bytes into bits.

Furthermore, the bitrate determination unit 106 calculates time new_time_ph that can be allocated to the data transmission from the relay apparatus 16 to the HMD 12 (S111). Here, for example, the time T_hp specified in the process illustrated in S108 is subtracted from the value TargetTransferTime of the target time information stored in the target time information storage unit 90, and a constant for absorbing the jitter is further subtracted from the value to calculate the time new_time_ph. The constant may be a constant equivalent to, for example, 5 to 10% of the value TargetTransferTime.

Furthermore, the bitrate determination unit 106 specifies a value new_tp_ph of a partial throughput corresponding to the data transmission from the relay apparatus 16 to the HMD 12 (S112). Here, for example, the time new_time_ph calculated in the process illustrated in S111 is multiplied by the value Tp_ph calculated in the process illustrated in S110 and divided by the value TargetTransferTime to specify the value as the value new_tp_ph.

Furthermore, the bitrate determination unit 106 determines the value PayloadBitrate_PtoH and the value PayloadBitrate_HtoP based on the value new_tp_ph specified in the process illustrated in S112 (S113).

Here, it is assumed that the value new_tp_ph is, for example, equal to or larger than a threshold Tp_PtoH_LowThreshold used to determine the deterioration trend of the communication environment. In this case, the value of the result of executing a clipping process for putting the specified value new_tp_ph into the range from the held value Tp_PtoH_ReqMin to the value Tp_PtoH_ReqMax is determined as the value PayloadBitrate_PtoH. Furthermore, the value Tp_HtoP_ReqMax is determined as the value PayloadBitrate_HtoP in this case.

Here, for example, the threshold Tp_PtoH_LowThreshold may be determined in a range of equal to or larger than the value Tp_PtoH_ReqMin and equal to or smaller than the value Tp_PtoH_ReqMax. More specifically, the threshold Tp_PtoH_LowThreshold may be, for example, a value obtained by dividing the sum of the value Tp_PtoH_ReqMin and the value Tp_PtoH_ReqMax by 2.

On the other hand, it is assumed that the value new_tp_ph is smaller than the threshold Tp_PtoH_LowThreshold. In this case, a value obtained by subtracting the value new_tp_ph from the threshold Tp_PtoH_LowThreshold is calculated as a value delta_tp_ph. Furthermore, a value obtained by subtracting the value delta_tp_ph from the value Tp_HtoP_ReqMax is calculated as a value new_tp_hp. Here, in a case where the calculated value new_tp_hp is smaller than the value Tp_HtoP_ReqMin, the value new_tp_hp is changed to the value Tp_HtoP_ReqMin.

Furthermore, the value of the result of executing the clipping process for putting the value new_tp_ph into the range from the held value Tp_PtoH_ReqMin to the value Tp_PtoH_ReqMax is determined as the value PayloadBitrate_PtoH. In addition, the value new_tp_hp is determined as the value PayloadBitrate_HtoP.

In this way, in the case where the value new_tp_ph corresponding to the bitrate that can be transmitted to the HMD 12 by the relay apparatus 16 falls below the threshold Tp_PtoH_LowThreshold in a round-trip communication, the size of the data transmitted per unit time by the HMD 12 in a later round-trip communication decreases. Note that in this case, a message indicating the deterioration of the communication environment in the HMD 12 may be output.

In this case, part of the sensing data generated by the sensing data generation unit 128 and stored in the sensing data buffer 130 is not transmitted by the sensing data transmission unit 132 and is not included in a later round-trip communication.

In this way, the video data with the minimum required quality is transmitted from the relay apparatus 16 to the HMD 12.

Note that in this case, the sensing data generation unit 128 may reduce the size of the data generated per unit time.

In addition, the threshold Tp_PtoH_LowThreshold may be a value corresponding to the distance between the relay apparatus 16 and the HMD 12 or the direction of the HMD 12 with respect to the relay apparatus 16. Here, the bitrate determination unit 106 may specify the distance between the relay apparatus 16 and the HMD 12 or the direction of the HMD 12 with respect to the relay apparatus 16 based on, for example, the value of the sensing data received by the sensing data reception unit 86. Furthermore, the bitrate determination unit 106 may determine the threshold Tp_PtoH_LowThreshold based on the specified distance or direction.

Here, for example, the value obtained by dividing the sum of the value Tp_PtoH_ReqMax and the value Tp_PtoH_ReqMin by 2 may be set as a reference value of the threshold Tp_PtoH_LowThreshold. Furthermore, the threshold Tp_PtoH_LowThreshold may be determined such that, for example, the longer the distance between the relay apparatus 16 and the HMD 12, the larger the value compared to the reference value. In addition, the threshold Tp_PtoH_LowThreshold may be determined such that, for example, the larger the angle formed by the direction from the user wearing the HMD 12 to the relay apparatus 16 and the direction from the back of the head to the front of the head of the user wearing the HMD 12, the larger the value compared to the reference value.

Furthermore, the bitrate determination unit 106 applies a filtering process to the value PayloadBitrate_PtoH determined in the process illustrated in S113 to change (correct) the value PayloadBitrate_PtoH (S114). Here, for example, the bitrate determination unit 106 may correct the value determined based on the time T_RT and the target time TargetTransferTime based on the result of the estimation of whether or not the communication path search process is occurring.

In addition, the filtering process may be executed here by using, for example, a low pass filter.

Note that in the process illustrated in S114, the filtering process may be applied to the value PayloadBitrate_HtoP to correct the value PayloadBitrate_HtoP.

Here, in the present processing example, the value PayloadBitrate_PtoH and the value PayloadBitrate_HtoP held by the bitrate determination unit 106 are updated to the values after the correction calculated in the process illustrated in S114.

Note that the filtering process illustrated in S114 will be described later.

Furthermore, the data size determination unit 108 calculates the value TransSize_PtoH and the value TransSize_HtoP. Furthermore, the data size determination unit 108 updates the held value TransSize_PtoH and value TransSize_PtoH to the calculated values (S115). Here, for example, the value PayloadBitrate_PtoH may be multiplied by the value TargetTransferTime indicated in the target time information stored in the target time information storage unit 90 and divided by 8 to calculate the value TransSize_PtoH. Here, the value PayloadBitrate_PtoH may be the value after the correction in the process illustrated in S114. In addition, for example, the value PayloadBitrate_HtoP may be multiplied by the value TargetTransferTime indicated in the target time information stored in the target time information storage unit 90 and divided by 8 to calculate the value TransSize_HtoP. Here, the value PayloadBitrate_HtoP may be the value after the correction in the process illustrated in S114. Note that here, the process of dividing the value by 8 is executed to covert bits into bytes.

Furthermore, the generation control unit 110 transmits, to the entertainment apparatus 14, generation control information indicating the value PayloadBitrate_PtoH corrected in the process illustrated in S114 (S116), and the process returns to S101. In this case, the generation control reception unit 84 receives the generation control information, and the video data generation unit 80 generates the transaction data 70 of the size corresponding to the value PayloadBitrate_PtoH per unit time (for example, per second).

Furthermore, as described above, the process illustrated in S101 to S116 is repeatedly executed in the present processing example.

In the present processing example, the value PayloadBitrate_HtoP determined in the process illustrated in S113 decreases in the case where the value new_tp_ph corresponding to the bitrate that can be transmitted to the HMD 12 by the relay apparatus 16 in a round-trip communication falls below the threshold Tp_PtoH_LowThreshold. Furthermore, in this case, the video data transmission unit 96 transmits, to the HMD 12, an instruction for reducing the size of the data transmitted per unit time in a later round-trip communication in the process illustrated in S102 in the loop of the next time. In this way, the relay apparatus 16 can control the bitrate of the data transmitted to the relay apparatus 16 by the HMD 12 in the present processing example.

Note that in the present processing example, the filtering process illustrated in S114 may not be executed. In this case, the value TransSize_PtoH is calculated based on the value PayloadBitrate_PtoH determined in the process illustrated in S113. In addition, the value TransSize_HtoP is calculated based on the value PayloadBitrate_HtoP determined in the process illustrated in S113.

Here, as described above, the video data generation unit 80 may change the quality, such as resolution and compression ratio, of the video to be generated according to the change in the value indicated in the generation control information transmitted in the process illustrated in S116. For example, when the value indicated in the generation control information becomes small, the quality of the video generated by the video data generation unit 80 may be reduced.

In the present embodiment, examples of the value of the target time TargetTranserTime include 1.5 milliseconds and 2 milliseconds. Furthermore, for example, the transaction data 70 of 125 kilobytes is written in the video data buffer 94 every millisecond. Hereinafter, the transaction data 70 (here, the transaction data 70 of 125 kilobytes) written at a time in the video data buffer 94 will be referred to as one block. Furthermore, it is desirable that the video data transmission unit 96 transmit the transaction data 70 of four blocks (for example, 500 kilobytes here) every 1.5 milliseconds in the case where the target time TargetTranserTime is 1.5 milliseconds. In addition, it is desirable that the sensing data transmission unit 132 transmit the transaction data 70 of 1 megabytes every 1.5 milliseconds.

Furthermore, in the present embodiment, the video data transmission unit 96 may transmit the video data in blocks of a predetermined size. For example, when the specified value TransSize_PtoH is 250 bytes, the video data transmission unit 96 may transmit the video data of two blocks (for example, 250 kilobytes here) in a round-trip communication. Furthermore, in this case, the video data transmission unit 96 may acquire two latest blocks among the blocks written in the video data buffer 94 and transmit the two blocks.

Note that in the processing example, the bitrate determination unit 106 may specify, for example, the value TransSize_HtoP_Act indicating the size of the transaction data 70 successfully received by the relay apparatus 16. Furthermore, the bitrate determination unit 106 may multiply the value TransSize_HtoP_Act by 8 and divide the value by the time T_hp specified in the process illustrated in S108 to calculate the value Tp_hp of the amount of data transmission (throughput) per unit time.

Furthermore, the bitrate determination unit 106 may calculate time new_time_hp that can be allocated to the data transmission from the HMD 12 to the relay apparatus 16. Here, for example, the time T_ph may be subtracted from the value TargetTransferTime of the target time information stored in the target time information storage unit 90, and the constant for absorbing the jitter may be further subtracted from the value to calculate the time new_time_hp.

Furthermore, the bitrate determination unit 106 may specify the value new_tp_hp of the partial throughput corresponding to the data transmission from the HMD 12 to the relay apparatus 16. Here, for example, the calculated time new_time_hp may be multiplied by the value Tp_hp and divided by the value TargetTransferTime, and the value may be specified as the value new_tp_hp. Furthermore, the value PayloadBitrate_HtoP may be calculated based on the value new_tp_hp as described above.

Figure 9:
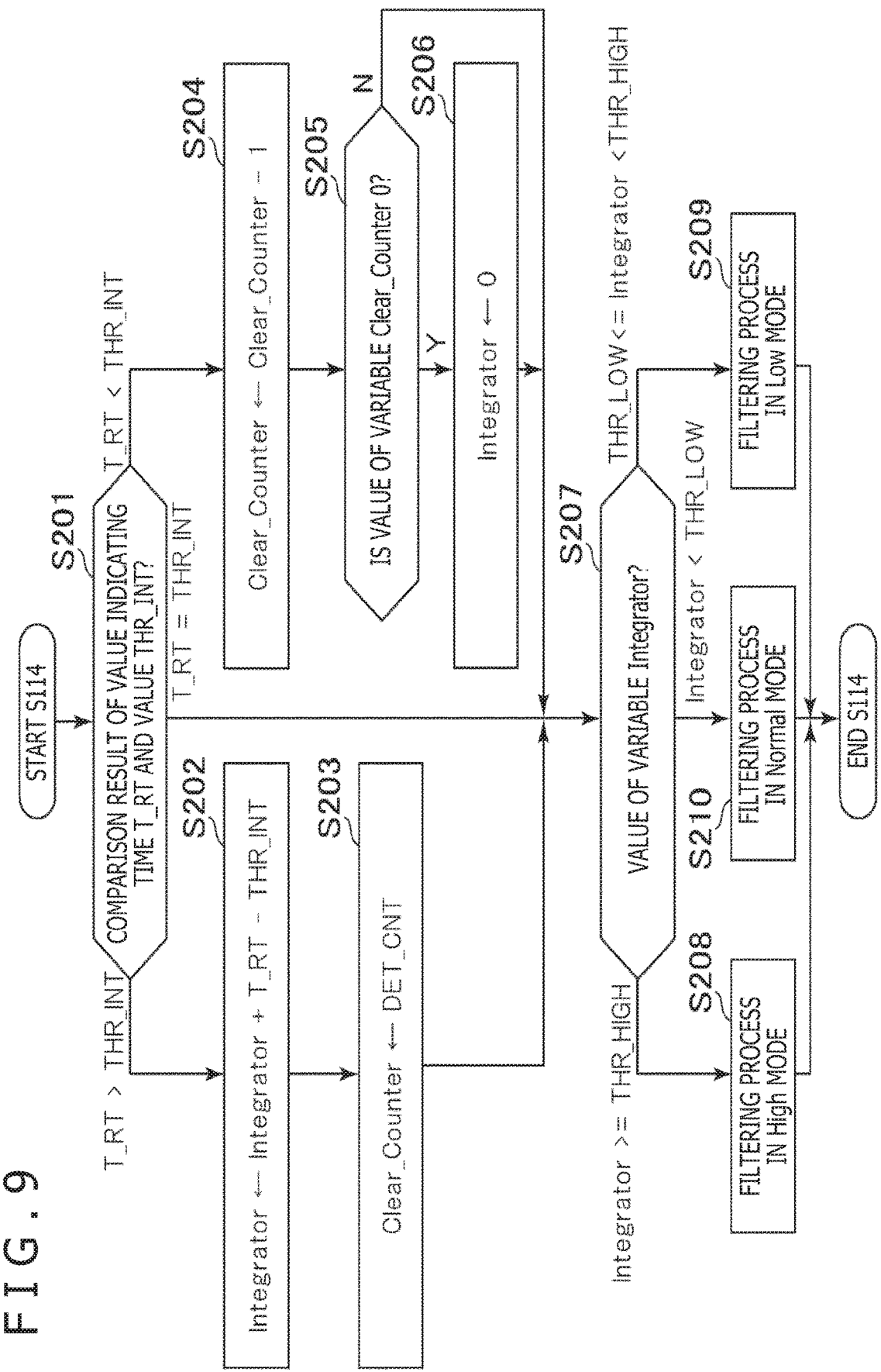
FIG. 9 is a flow chart illustrating an example of a flow of a process executed in the relay apparatus according to the embodiment of the present invention.

Next, an example of a flow of the filtering process illustrated in S114 executed by the relay apparatus 16 according to the present embodiment will be described with reference to a flow chart illustrated in FIG. 9.

In the process illustrated in the following processing example, whether or not the communication path search process is occurring is estimated based on a value of a variable Integrator indicating a cumulative value of the evaluation value regarding whether or not the communication path search process is occurring. Furthermore, a filtering process using a low pass filter with a filter constant corresponding to the result of the estimation is executed. Note that it is assumed that the initial value of the variable Integrator is 0. In addition, it is assumed that the search occurrence estimation unit 104 holds the given value THR_INT. Note that it is assumed that the value THR_INT is larger than the value indicating the target time TargetTransferTime.

In addition, it is assumed that the search occurrence estimation unit 104 also holds a given value THR_LOW as a reference for executing the filtering process in a Low mode and a given value THR_HIGH as a reference for executing the filtering process in a High mode. In addition, it is assumed that the bitrate determination unit 106 also holds an initial value DET_CNT of a variable Clear_Counter for determining to reset the variable Integrator to 0.

First, the search occurrence estimation unit 104 compares the value indicating the time T_RT specified in the process illustrated in S108 and the value THR_INT (S201).

Here, in a case where it is confirmed that the value indicating the time T_RT is larger than the value THR_INT, the search occurrence estimation unit 104 adds a value obtained by subtracting the given value THR_INT from the value indicating the time T_RT to the value of the variable integrator (S202). Furthermore, the search occurrence estimation unit 104 sets the value of the variable Clear_Counter to the value DET_CNT (S203).

In a case where it is confirmed that the value indicating the time T_RT is smaller than the value THR_INT in the process illustrated in S201, the search occurrence estimation unit 104 subtracts 1 from the value of the variable Clear_Counter (S204). Note that in a case where the value of the variable Clear_Counter is 0 here, the search occurrence estimation unit 104 does not update the value of the variable Clear_Counter. Furthermore, the bitrate determination unit 106 checks whether or not the value of the variable Clear_Counter is 0 (S205).

In a case where it is confirmed that the value is not 0 (S205: N), the process proceeds to S207. In a case where it is confirmed that the value is 0 (S205: Y), the search occurrence estimation unit 104 sets the value of the variable Integrator to 0 (S206) and proceeds to the process illustrated in S207. That is, in a case where the value indicating the time T_RT is continuously smaller than the value THR_INT for a number of times corresponding to the value DET_CNT, the value of the variable Integrator is reset to 0.

After the end of the process illustrated in S201 to S206, the search occurrence estimation unit 104 checks the value of the variable Integrator (S207). Note that in the present processing example, the process illustrated in S207 is also executed in a case where it is confirmed that the value indicating the time T_RT is the same as the value THR_INT in the process illustrated in S201.

In a case where the value of the variable Integrator is equal to or larger than the value THR_HIGH, the bitrate determination unit 106 executes the filtering process in the High mode (S208), and the process illustrated in S114 ends.

In a case where the value of the variable Integrator is equal to or larger than the value THR_LOW and smaller than the value THR_HIGH, the bitrate determination unit 106 executes the filtering process in the Low mode (S209), and the process illustrated in S114 ends.

In a case where the value of the variable Integrator is smaller than the value THR_LOW, the bitrate determination unit 106 executes the filtering process in a Normal mode (S210), and the process illustrated in S114 ends.

Here, for example, the value PayloadBitrate_PtoH may be changed so that the difference from the value PayloadBitrate_PtoH held by the bitrate determination unit 106 becomes smaller in the High mode than in the Low mode and smaller in the Low mode than in the Normal mode. For example, the filter constant may be determined so that the time constant becomes larger in the High mode than in the Low mode and larger in the Low mode than in the Normal mode.

In addition, for example, the value PayloadBitrate_PtoH may be changed to a value obtained by adding, to the value PayloadBitrate_PtoH held by the bitrate determination unit 106, the sum of the difference between the value PayloadBitrate_PtoH and the value PayloadBitrate_PtoH determined in the process illustrated in S113 in the loop of this time and a coefficient larger than 0 and smaller than 1.

Furthermore, in the case of changing and reducing the value PayloadBitrate_PtoH, the value PayloadBitrate_PtoH may be changed so that the difference from the held value PayloadBitrate_PtoH becomes larger in the High mode and the Low mode than in the Normal mode. For example, in the case of changing and reducing the value PayloadBitrate_PtoH, the filter constant may be determined so that the time constant becomes smaller in the High mode and the Low mode than in the Normal mode. Furthermore, for example, the coefficient in the High mode or the Low mode may be larger than the coefficient in the Normal mode. In this case, the value PayloadBitrate_PtoH is changed so that the change is larger in the High mode or the Low mode than in the Normal mode. Note that in the case of changing and reducing the value PayloadBitrate_PtoH, the filtering process may not be executed in the High mode and the Low mode.

Note that in the case of changing and reducing the value PayloadBitrate_PtoH, the value PayloadBitrate_PtoH may be changed so that the difference from the held value PayloadBitrate_PtoH becomes larger in the High mode than in the Low mode.

Furthermore, in the case of changing and increasing the value PayloadBitrate_PtoH, the value PayloadBitrate_PtoH may be changed so that the difference from the held value PayloadBitrate_PtoH becomes smaller in the High mode and the Low mode than in the Normal mode. For example, in the case of changing and increasing the value PayloadBitrate_PtoH, the filter constant may be determined so that the time constant becomes larger in the High mode and the Low mode than in the Normal mode. In addition, for example, the coefficient in the High mode or the Low mode may be smaller than the coefficient in the Normal mode. In this case, the value PayloadBitrate_PtoH is changed so that the change is smaller in the High mode or the Low mode than in the Normal mode.

Note that in the case of changing and increasing the value PayloadBitrate_PtoH, the value PayloadBitrate_PtoH may be changed so that the difference from the held value PayloadBitrate_PtoH becomes smaller in the High mode than in the Low mode.

In addition, the filter constant may be determined based on the responsiveness of the video data generation unit 80.

Note that the present invention is not limited to the embodiment.

For example, part or all of the functions illustrated as the functions of the entertainment apparatus 14 in FIG. 7 described above may be implemented in the HMD 12 or the relay apparatus 16.

Figure 10:
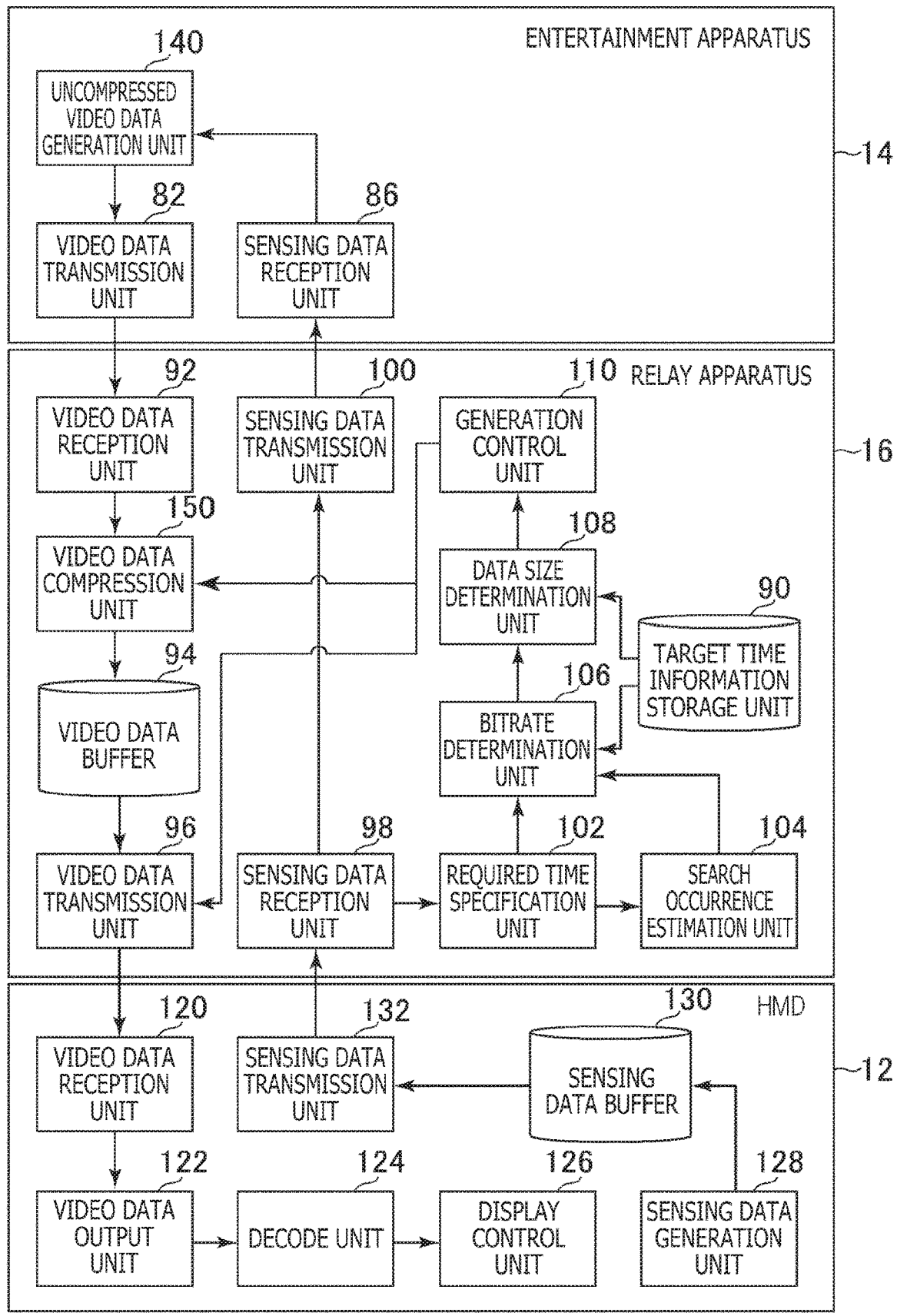
FIG. 10 is a functional block diagram illustrating an example of functions implemented in the head-mounted display, the entertainment apparatus, and the relay apparatus according to another embodiment of the present invention.

FIG. 10 is a functional block diagram illustrating an example of functions implemented in the HMD 12, the entertainment apparatus 14, and the relay apparatus 16 according to another embodiment of the present invention. Note that in the entertainment system 10 according to the present embodiment, not all of the functions illustrated in FIG. 10 need be implemented, and functions other than the functions illustrated in FIG. 10 may also be implemented.

As illustrated in FIG. 10, the entertainment apparatus 14 according to the present embodiment includes, for examples, functions of an uncompressed video data generation unit 140, the video transmission unit 82, and the sensing data reception unit 86. The master unit of the uncompressed video data generation unit 140 is the processor 50. The master unit of the video data transmission unit 82 and the sensing data reception unit 86 is the input/output unit 56.

A program that is installed on the entertainment apparatus 14 as a computer and that includes instructions corresponding to the functions may be executed by the processor 50 to implement the functions. The program may be supplied to the entertainment apparatus 14 through a computer-readable information storage medium, such as an optical disk, a magnetic disk, a magnetic tape, a magneto-optical disk, and a flash memory, or through the Internet or the like.

In addition, as illustrated in FIG. 10, the relay apparatus 16 according to the present embodiment has functions including, for example, the target time information storage unit 90, the video data reception unit 92, a video data compression unit 150, the video data buffer 94, the video data transmission unit 96, the sensing data reception unit 98, the sensing data transmission unit 100, the required time specification unit 102, the search occurrence estimation unit 104, the bitrate determination unit 106, the data size determination unit 108, and the generation control unit 110. The master unit of the target time information storage unit 90 and the video data buffer 94 is the storage unit 62. The master unit of the video data reception unit 92 and the sensing data transmission unit 100 is the input/output unit 66. The master unit of the video data transmission unit 96 and the sensing data reception unit 98 is the communication unit 64. The master unit of the required time specification unit 102, the search occurrence estimation unit 104, the bitrate determination unit 106, the data size determination unit 108, and the video data compression unit 150 is the processor 60. The master units of the generation control unit 110 are the processor 60 and the input/output unit 66.

A program that is installed on the relay apparatus 16 as a computer and that includes instructions corresponding to the functions may be executed by the processor 60 to implement the functions. The program may be supplied to the relay apparatus 16 through a computer-readable information storage medium, such as an optical disk, a magnetic disk, a magnetic tape, a magneto-optical disk, and a flash memory, or through the Internet or the like.

In addition, as illustrated in FIG. 10, the HMD 12 according to the present embodiment has functions including, for example, the video data reception unit 120, the video data output unit 122, the decode unit 124, the display control unit 126, the sensing data generation unit 128, the sensing data buffer 130, and the sensing data transmission unit 132. The master unit of the video data reception unit 120 and the sensing data transmission unit 132 is the communication unit 34. The master unit of the video data output unit 122 and the decode unit 124 is the processor 30. The master units of the display control unit 126 are the processor 30 and the display unit 38. The master units of the sensing data generation unit 128 are the processor 30, the sensor unit 40, and the camera units 44. The master unit of the sensing data buffer 130 is the storage unit 32.

A program that is installed on the HMD 12 as a computer and that includes instructions corresponding to the functions may be executed by the processor 30 to implement the functions. The program may be supplied to the HMD 12 through a computer-readable information storage medium, such as an optical disk, a magnetic disk, a magnetic tape, a magneto-optical disk, and a flash memory, or through the Internet or the like.

The uncompressed video data generation unit 140 generates, for example, uncompressed video data (video data not compressed) representing the video to be displayed on the display unit 38 of the HMD 12 in the present embodiment.

The video data transmission unit 82 transmits, for example, the uncompressed video data generated by the uncompressed video data generation unit 140 to the relay apparatus 16 in the present embodiment.

The video data reception unit 92 receives, for example, uncompressed video data transmitted from the entertainment apparatus 14 in the present embodiment.

The video data compression unit 150 generates compressed video data by, for example, compressing the uncompressed video data received by the video data reception unit 92 in the present embodiment. In addition, the video data compression unit 150 may compress the uncompressed video data received by the video data reception unit 92 and then generate the transaction data 70 corresponding to the compressed video data.

The video data buffer 94 stores, for example, the compressed video data generated by the video data compression unit 150 in the present embodiment.

The video data transmission unit 96 transmits, for example, the compressed video data generated by the video data compression unit 150 to the HMD 12 in the present embodiment. For example, the video data transmission unit 96 transmits the video data stored in the video data buffer 94 to the HMD 12.

The generation control unit 110 controls, for example, the video data compression unit 150 to generate, per unit time, the data (for example, transaction data 70) of the size corresponding to the bitrate determined by the bitrate determination unit 106 as described above in the present embodiment. Here, the generation control unit 110 may control, for example, the compression ratio in the compression of video by the video data compression unit 150 in order to generate, per unit time, the data of the size corresponding to the determined bitrate.

The content other than the content described above is similar to the content described with reference to FIG. 7, and the description will not be repeated.

In the example of FIG. 10, the generation control unit 110 controls the relay apparatus 16 to generate the data of the size corresponding to the determined bitrate per unit time. Furthermore, the generation control unit 110 does not transmit the generation control information to the entertainment apparatus 14 in this case.

In addition, part or all of the functions illustrated as the functions of the relay apparatus 16 in FIG. 7 may be implemented in the HMD 12 or the entertainment apparatus 14.

In addition, the specific character strings and numerical values described above and the specific character strings and numerical values in the drawings are illustrative, and the character strings and the numerical values are not limited to these.

The invention claimed is:

1. A communication apparatus that performs half-duplex wireless communication with a communication partner, the communication apparatus comprising:
    a data generation unit;
    a transmission unit that transmits data generated by the data generation unit to the communication partner in response to sensing data received from the communication partner;
    a reception unit that receives data transmitted from the communication partner, the data including size data indicating a size of the data successfully received from the communication apparatus by the communication partner;
    a time specification unit that specifies time it took for a round-trip communication in the half-duplex wireless communication with the communication partner; and
    a generation control unit that controls a size of the data generated by the data generation unit per unit time based on (1) the specified time, (2) the size indicated in the size data, and (3) a given target time regarding the round-trip communication.

2. The communication apparatus according to claim 1, wherein
    the time specification unit specifies the time it took for the round-trip communication corresponding to time from the start of the transmission of the data to the communication partner in a first period to the end of the reception of the data transmitted by the communication partner in a second period following the first period, and
    the reception unit receives the size data indicating the size of the data successfully received by the communication partner in the first period.

3. The communication apparatus according to claim 1, wherein
    the reception unit receives sensing data transmitted from the communication partner,
    the data generation unit generates data of a video, and
    the generation control unit controls quality of the data of the video.

4. A communication partner that performs half-duplex wireless communication with a communication apparatus, the communication partner comprising:
    a reception unit that receives data from the communication apparatus; and
    a transmission unit that transmits, to the communication apparatus, sensing data including, in a header, size data indicating a size of successfully received data from the communication apparatus, wherein:
    the transmission unit transmits the sensing data even in a case where the reception of part of the data transmitted by the communication apparatus has failed; and
    the communication apparatus includes: (i) a data generation unit; (ii) a transmission unit that transmits data generated by the data generation unit to the communication partner in response to sensing data received from the communication partner; (iii) a reception unit that receives data transmitted from the communication partner, the data including size data indicating a size of the data successfully received from the communication apparatus by the communication partner; (iv) a time specification unit that specifies time it took for a round-trip communication in the half-duplex wireless communication with the communication partner; and (v) a generation control unit that controls a size of the data generated by the data generation unit per unit time based on (1) the specified time, (2) the size indicated in the size data, and (3) a given target time regarding the round-trip communication.

5. The communication apparatus according to claim 4, wherein
    the reception unit receives encoded video data from the communication partner apparatus,
    the communication apparatus further includes an output unit that outputs the video data to a decode unit, and
    for part of the video data failed to receive, the output unit outputs the video data supplemented with predetermined data to the decode unit.

6. The communication partner according to claim 4, wherein
    the reception unit receives a plurality of packets provided with sequence numbers in one communication, and
    when the transmission unit successfully receives a packet with the last sequence number among the plurality of packets, the transmission unit transmits the size data in response to the reception of the plurality of packets even in a case where the reception of at least one of the plurality of packets has failed.

7. A generated data size control method comprising:
    transmitting data generated by a data generation unit to a communication partner;
    receiving data transmitted from the communication partner, the data including size data indicating a size of the data successfully received by the communication partner;
    specifying time it took for a round-trip communication in half-duplex wireless communication with the communication partner; and
    controlling a size of the data generated by the data generation unit per unit time based on the specified time, the size indicated in the size data, and a given target time regarding the round-trip communication.

8. A communication method comprising:
    receiving data from a communication apparatus at a communication partner; and
    transmitting, from the communication partner to the communication apparatus, sensing data including, in a header, size data indicating a size of successfully received data from the communication apparatus, wherein:
    in the transmitting of the sensing data, the sensing data is transmitted even in a case where the reception of part of the data transmitted by the communication apparatus and received by the communication partner has failed; and
    the communication apparatus performs half-duplex wireless communication with the communication partner by: (i) transmitting data generated by a data generation unit to the communication partner in response to sensing data received from the communication partner; (ii) receiving data transmitted from the communication partner, the data including size data indicating a size of the data successfully received from the communication apparatus by the communication partner; (iii) specifying time it took for a round-trip communication in the half-duplex wireless communication with the communication partner; and (iv) controlling a size of the data generated by the data generation unit per unit time based on (1) the specified time, (2) the size indicated in the size data, and (3) a given target time regarding the round-trip communication.

9. A non-transitory, computer readable storage medium containing a computer program, which when executed by a computer, causes the computer to carry out actions, comprising:

transmitting data generated by a data generation unit to a communication partner;

receiving data transmitted from the communication partner, the data including size data indicating a size of the data successfully received by the communication partner;

specifying time it took for a round-trip communication in half-duplex wireless communication with the communication partner; and controlling a size of the data generated by the data generation unit per unit time based on the specified time, the size indicated in the size data, and a given target time regarding the round-trip communication.

10. A non-transitory, computer readable storage medium containing a computer program, which when executed by a computer, causes the computer to carry out actions, comprising:

receiving data from a communication apparatus at a communication partner; and transmitting from the communication partner, to the communication apparatus, sensing data including, in a header, size data indicating a size of successfully received data from the communication apparatus, wherein:

in the transmitting of the sensing data, the sensing data is transmitted even in a case where the reception of part of the data transmitted by the communication apparatus has failed; and the communication apparatus performs half-duplex wireless communication with the communication partner by: (i) transmitting data generated by a data generation unit to the communication partner in response to sensing data received from the communication partner; (ii) receiving data transmitted from the communication partner, the data including size data indicating a size of the data successfully received from the communication apparatus by the communication partner; (iii) specifying time it took for a round-trip communication in the half-duplex wireless communication with the communication partner; and (iv) controlling a size of the data generated by the data generation unit per unit time based on (1) the specified time, (2) the size indicated in the size data, and (3) a given target time regarding the round-trip communication.

11. The communication partner according to claim 4, wherein the communication partner apparatus further comprises:

a sensor unit that detects acceleration and angular velocity of a user's head; and a camera, wherein the sensing data includes the acceleration and angular velocity detected by the sensor unit and images captured by the camera.

* * * * *